(12) United States Patent
Cheng et al.

(10) Patent No.: US 10,976,152 B2
(45) Date of Patent: Apr. 13, 2021

(54) METHOD FOR DEFECT INSPECTION OF TRANSPARENT SUBSTRATE BY INTEGRATING INTERFERENCE AND WAVEFRONT RECORDING TO RECONSTRUCT DEFECT COMPLEX IMAGES INFORMATION

(71) Applicant: National Taiwan Normal University, Taipei (TW)

(72) Inventors: Chau-Jern Cheng, Taipei (TW); Chin-Yu Liu, Taipei (TW); Xin-Ji Lai, Taipei (TW)

(73) Assignee: NATIONAL TAIWAN NORMAL UNIVERSiTY, Taipei (TW)

( * ) Notice: Subject to any disclaimer, the term of this patent is extended or adjusted under 35 U.S.C. 154(b) by 87 days.

(21) Appl. No.: 15/590,706

(22) Filed: May 9, 2017

(65) Prior Publication Data
US 2018/0188016 A1    Jul. 5, 2018

(30) Foreign Application Priority Data
Jan. 5, 2017    (TW) ................... 106100291

(51) Int. Cl.
*G01B 9/02*    (2006.01)
*G01B 9/021*    (2006.01)
(Continued)

(52) U.S. Cl.
CPC .......... *G01B 9/021* (2013.01); *G01B 9/0201* (2013.01); *G01B 9/0203* (2013.01);
(Continued)

(58) Field of Classification Search
CPC .......... G01B 9/021; G01B 9/02018; G01B 9/02016; G01B 9/0201; G01B 9/0203;
(Continued)

(56) References Cited

U.S. PATENT DOCUMENTS

| | | | |
|---|---|---|---|
| 6,603,543 B1* | 8/2003 | La Fontaine | G01N 21/95607 356/237.4 |
| 6,999,178 B2* | 2/2006 | Hanson | G01B 11/0675 356/484 |

(Continued)

FOREIGN PATENT DOCUMENTS

| | | |
|---|---|---|
| CN | 101241086 A | 8/2008 |
| CN | 101750422 A | 6/2010 |

(Continued)

*Primary Examiner* — Hwa Andrew Lee
(74) *Attorney, Agent, or Firm* — Muncy, Geissler, Olds and Lowe, P.C.

(57) ABSTRACT

A method for defect inspection of a transparent substrate comprises (a) providing an optical system for performing a diffraction process of object wave passing through a transparent substrate, (b) interfering and wavefront recording for the diffracted object wave and a reference wave to reconstruct the defect complex images (including amplitude and phase) of the transparent substrate, (c) characteristics analyzing, features classifying and sieving for the defect complex images of the transparent substrate, and (d) creating defect complex images database based-on the defect complex images for comparison and detection of the defect complex images of the transparent substrate.

8 Claims, 21 Drawing Sheets

(51) Int. Cl.
*G03H 1/04* (2006.01)
*G03H 1/00* (2006.01)

(52) U.S. Cl.
CPC ..... *G01B 9/02016* (2013.01); *G01B 9/02018* (2013.01); *G03H 1/0443* (2013.01); *G03H 2001/0033* (2013.01); *G03H 2001/0447* (2013.01); *G03H 2001/0456* (2013.01); *G03H 2210/12* (2013.01); *G03H 2223/12* (2013.01); *G03H 2223/52* (2013.01); *G03H 2223/55* (2013.01)

(58) Field of Classification Search
CPC ............... G03H 1/16; G03H 1/0404; G03H 2001/0212; G03H 2001/0216
See application file for complete search history.

(56) References Cited

U.S. PATENT DOCUMENTS

| | | | | |
|---|---|---|---|---|
| 10,082,653 | B1* | 9/2018 | Liu | G02B 21/0056 |
| 2005/0046857 | A1* | 3/2005 | Bingham | G01B 11/0675 356/457 |
| 2008/0137933 | A1* | 6/2008 | Kim | G03H 1/0866 382/131 |

FOREIGN PATENT DOCUMENTS

| | | |
|---|---|---|
| CN | 102305798 B | 5/2013 |
| TW | I512284 | 12/2015 |

* cited by examiner

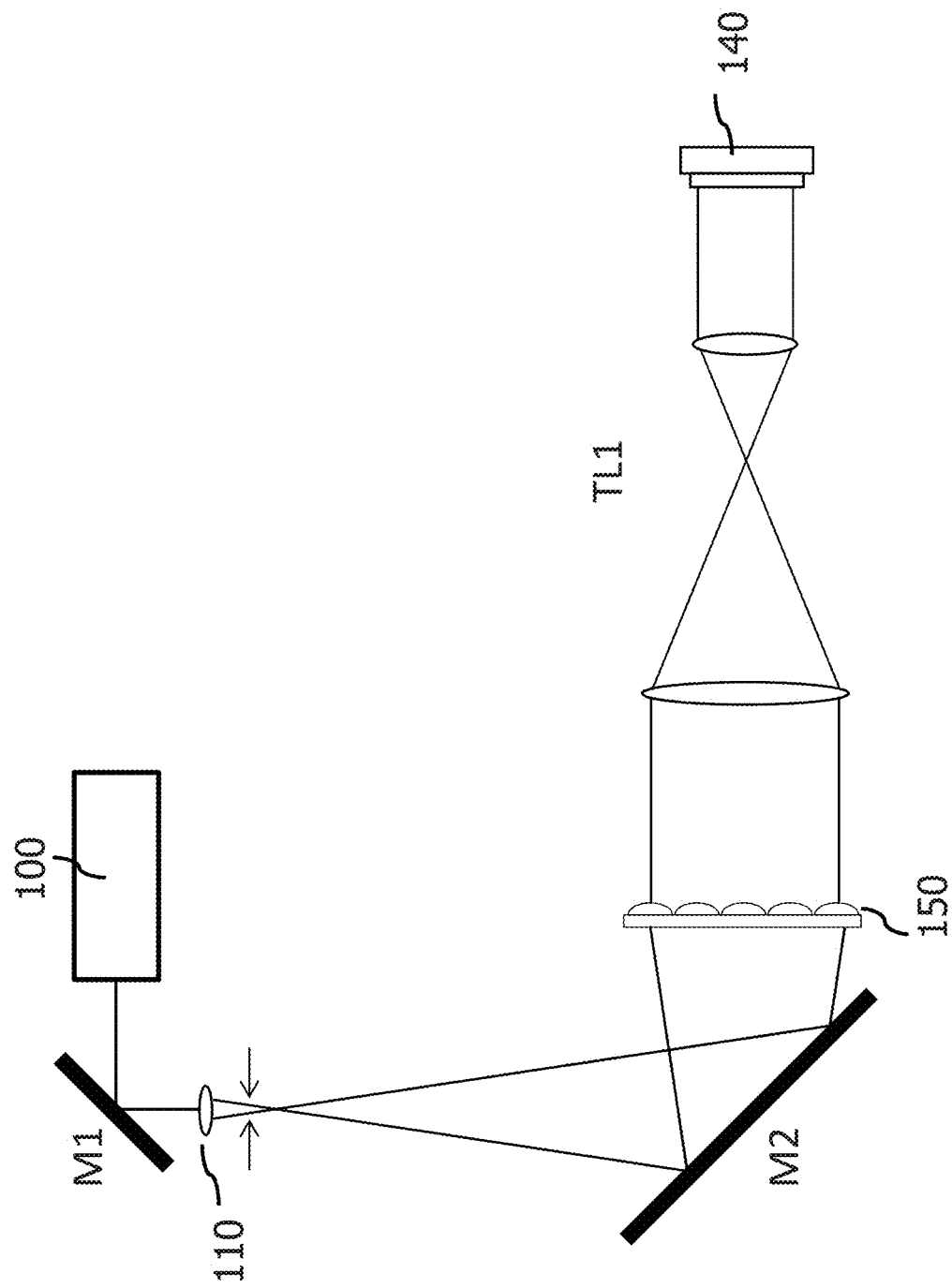

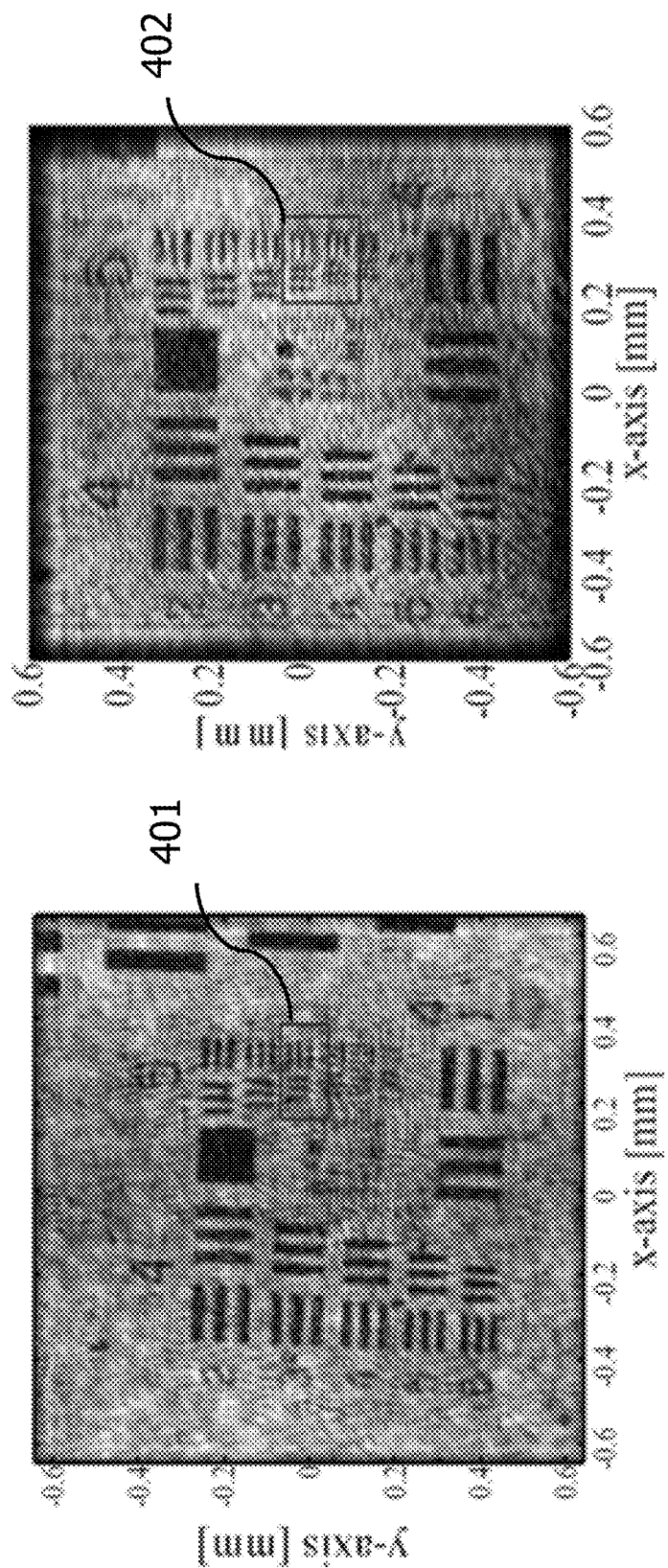

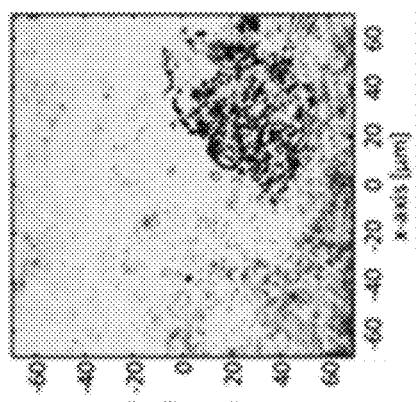
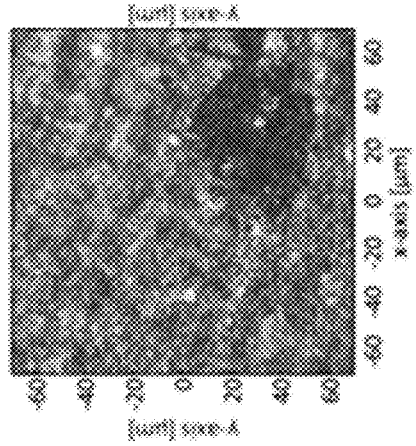
FIG.6B
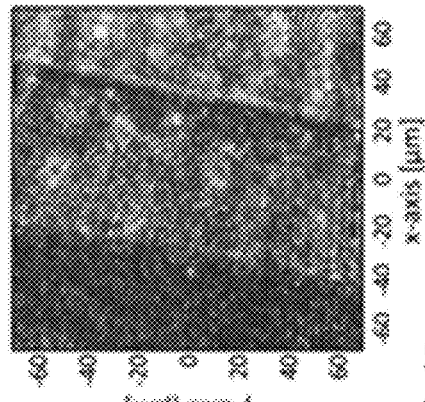
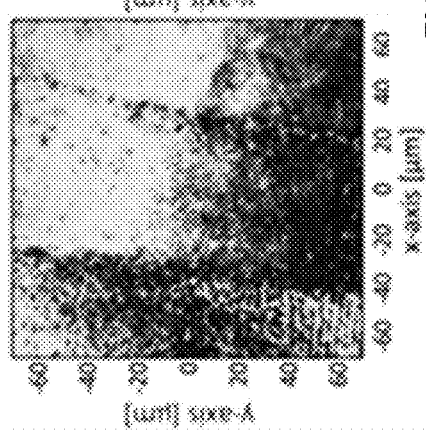
FIG.6D
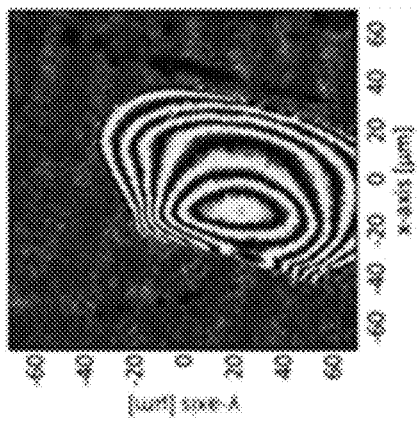
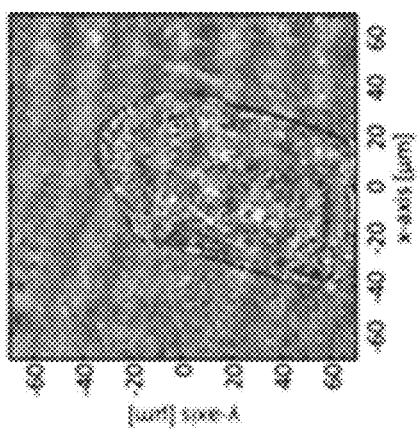
FIG.6A
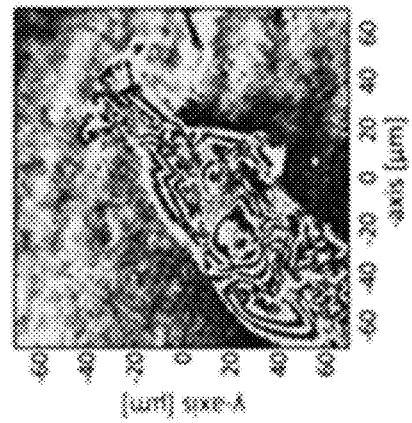
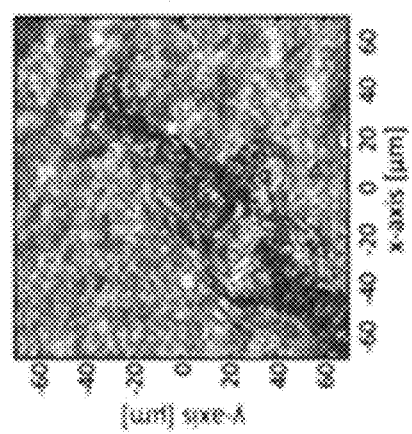
FIG.6C

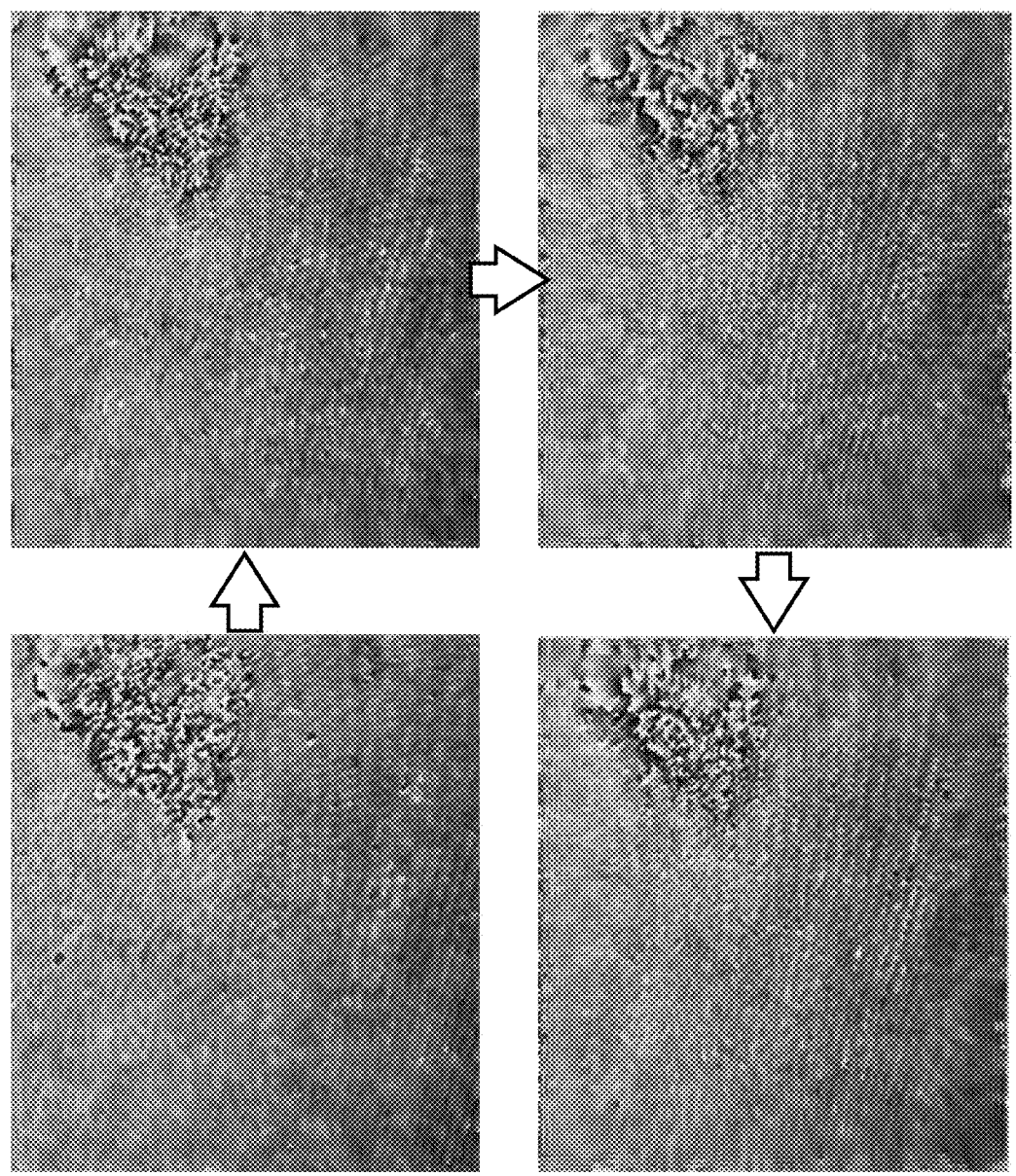

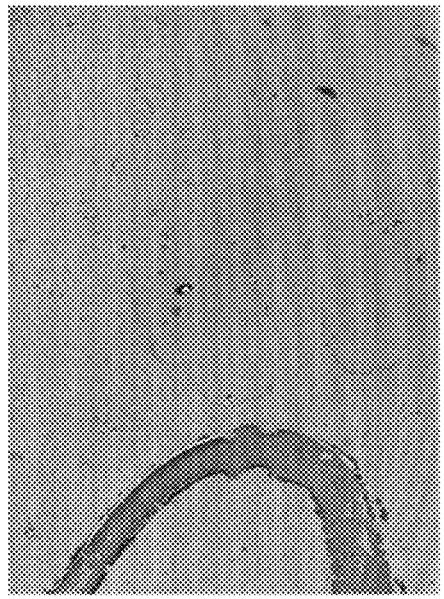
FIG.10A
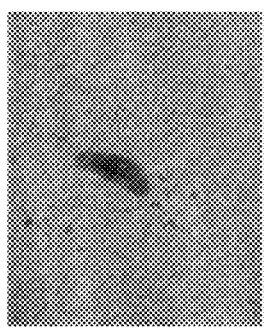
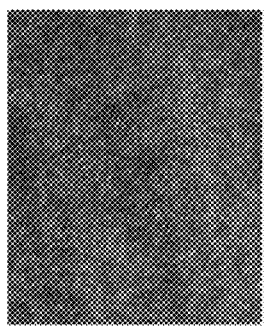
FIG.10C
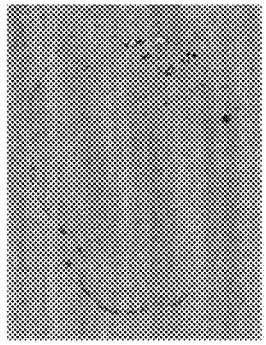
FIG.10E
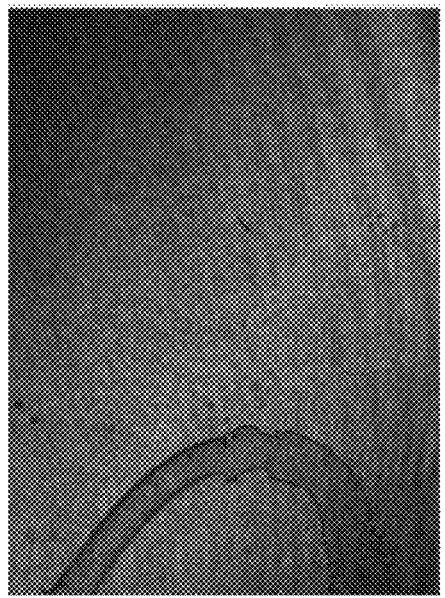
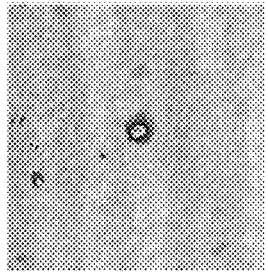
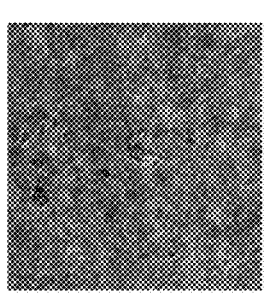
FIG.10B
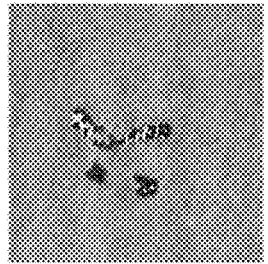
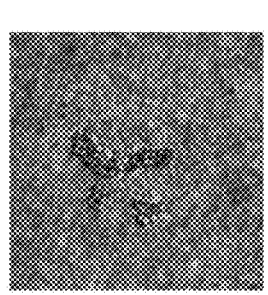
FIG.10D

METHOD FOR DEFECT INSPECTION OF TRANSPARENT SUBSTRATE BY INTEGRATING INTERFERENCE AND WAVEFRONT RECORDING TO RECONSTRUCT DEFECT COMPLEX IMAGES INFORMATION

TECHNICAL FIELD

The present invention relates to defect inspection of a transparent substrate, and more particularly, to a method and apparatus for inspection of defect complex images by integrating interference and wavefront recording to reconstruct the defect complex images information.

BACKGROUND

Glass substrate is one of the most popular and widely components applied for all kinds of optoelectronic products, such as photoelectric display, intelligent mobile phone panel, micro lens and so on. There are a lot of requirements and applications of glass substrate in the field of optoelectronic industry. Especially, in manufacturing and assembling of photovoltaic products including photoelectric display (for example: liquid crystal display, plasma display panel, organic light emitting diode), digital camera, intelligent mobile phone panel, the glass substrate plays a very significant and key role. In addition, in bonding with silicon chip, microelectromechanical systems (MEMS), Bio-medical, micro mirror, micro glass-block, polarized beam splitter, and dichroic filter, all kinds of glass substrates are also used.

Furthermore, in the high-tech industries, such as the semiconductor manufacturing process, precision machinery and display devices, all of them are tendency to miniaturization, precision, and nanometer level. Therefore, in the development of measurement equipment, manufacturing technology, and integrated technology in the field of precision machinery, the defect detection technology of glass substrate is very important.

Please refer to China patent application No. CNI01241086, it discloses "a detecting apparatus based-on detecting bubble, impurity of glass substrate"; the other, China patent application No. CNI01750422, it discloses "an on-line automatic detection device of defects on glass"; and, China No. CNI02305798, it discloses "detection and classification method of defects on glass based-on machine vision". However, in the disclosure of the above-mentioned patent applications, method of detection and classification of defects on glass only performs edge detection for the image to obtain edge information of the defects. Such methods are not suitable for detection of micro bubble defects on glass, and the micro bubble detection system or device is still needed to be further improved for facilitating detection of the defects.

In addition, please refer to the R.O.C. Patent No. I512284 entitled "defect detection system for bubble on glass", which utilizes a diffused light irradiating to a piece of glass substrate to be detected, to obtain an illumination image of glass substrate, and utilizes binarization threshold for searching a bubble image in the region of interest, to achieve the purpose of improving test accuracy. However, this method utilizes extraction of intensity image information, combining with image processing and retrieval comparison of database, to determine the location of defects and type of glass substrate.

In practice, the most transparent glass substrate is still utilizing manual or semi mechanical operation mode to obtain reflection or penetrating pattern of glass substrate to identify the possible defects. Some methods are utilizing machine vision to use camera for shooting reflection or penetration pattern of the glass substrate, and further performing some defect image algorithms to complete the detection. However, through the machine vision camera, only the intensity image can be obtained, and the complex images information of the glass substrate can't be obtained completely. Furthermore, it is easy to lose focus or without focusing because the camera can't effectively focus on transparent substrate. Therefore, it is often necessary to carry out a complicated and time-consuming algorithm for multiple pre-signal processing and classification to proceed the following detection task. Thus, the existing machine vision can't provide quickly and effectively detect the transparent substrate and improve yield of detection due to the above complicated operations.

Defects detection items of micro optics include: surface defect detection, surface roughness, surface profile, film thickness and roughness, curvature radius, wavefront measurement, aberration analysis, refractive index distribution etc. At present, there are some defects detection technologies, such as metallographic microscope, confocal microscope, atomic force microscope and white light interferometer. According to the different defect types of detection techniques, the detection apparatus and structure need to be developed to meet the speed of the production line. However, in the wide-field optical imaging system of traditional defect detection, some problems exist, such as: poor image pixel resolution of sensor, that require the use of mechanical scanning and image stitching and other related technologies, to complete wide field reconstructed image with high resolution of a large area. This leads to time-consuming of defect detection process, so that only some samples can be extracted to shorten the detection time. In addition, the defect detection technology of traditional industrial products can't be applied to penetrating detection of transparent glass substrate. Therefore, how to effectively implement the detection of transparent substrate to improve resolution and field of view, and shorten the detecting time and improve the detection area, has become an important issue in the industry and field of detection. Therefore, how to improve the field of view and high resolution imaging mechanism to shorten the detection time and increase the number of detection has become an important issue in the current defect detection.

In view of a rapid evolution in nano and micron technology, the production of many industries has trend of miniaturization manufacture and applications. The integrated circuit and semiconductor components, and micro optic elements are essential components of the technology products. In recent years, the demand and use of smart phones and display panel products are the most significant influenced by the rapid spread of social media and Internet information. Therefore, in the face of rapid production demand, how to effectively improve the yield of process and product has become an important indicator of business operation cost.

The defects of the transparent substrate may lead to serious yield decline of the whole product process and assembly, and greatly increase the cost of production and waste of resources. Therefore, it is very important for defect detection of the transparent substrate in the manufacturing and assembling processes of the photoelectric products.

However, at present, there is no effective and reliable transparent substrate defect detection technology and method available for industrial applications. It is necessary to develop a novel optical detection technology to solve the above problems.

SUMMARY OF THE INVENTION

In this invention, a method for defect inspection of a transparent substrate comprises (a) providing an optical system for performing a diffraction process of object wave passing through a transparent substrate to create optical diffraction field, to solve the constrained issue of actual pixel size of the photodetector array, (b) interfering and wavefront recording for the diffracted object wave and a reference wave to form at least one hologram for wavefront recording to reconstruct the defect complex images (including amplitude and phase) of the transparent substrate, (c) characteristics analyzing, features classifying and sieving for the defect complex images of the transparent substrate by numerical reconstruction, and (d) creating defect complex images database based-on the defect complex images for comparison and detection of the defect complex images of the transparent substrate.

The optical system includes at least one optical image reduction system to record at least one hologram in the step (b). The diffracted object wave and the reference wave are interfered to form at least one hologram, and wavefront recording the at least one hologram to reconstruct the defect complex images of the transparent substrate in the step (b). The defect complex images by numerical reconstruction include amplitude image and phase image in said step (b). The defect complex images comprise bubble image, dust image, scratch image and watermark image.

According to one aspect, the method further comprises a numerical propagation and focusing for the defect complex images to reconstructed characteristics of the defect complex images in different planes, in said step (c).

According to another aspect, the defect complex images in said step (c) are created by image characteristics in the three-dimensional coordinate axis.

According to yet another aspect, the transparent substrate is for example glass substrate, sapphire substrate, transparent ceramic substrate, transparent polymer substrate, such as polycarbonate (PC) substrate, Polymethylmethacrylate (PMMA) substrate or high transmittance optical substrate.

According to one aspect, the method further comprises up-sampling the defect complex images to improve equivalent resolution of a photodetector array of the optical system, and the numerical reconstruction by Fourier transform approach, convolution approach, angular spectrum approach or Fresnel diffraction transform approach to reconstruct the defect complex images of the transparent substrate.

The defect complex images are stored a database, in the step (d). The defect complex images are identified and classified by at least one classification unit, in the step (c).

An apparatus for defect inspection of a transparent substrate comprises a light source and at least one mirror to redirect optical path of the light source; a beam expander to generate an expanded beam of the light source; a first beam splitter configured under the beam expander; a second beam splitter; and a phase shifter for adjusting phase shift of a reference wave; a lenses set including plural lenses configured a side of the first beam splitter or the second beam splitter; and a photodetector array configured a side of the second beam splitter.

According to one aspect, the lenses set includes a first lens and a second lens to form an optical image reduction system.

The first lens and the second lens can be microscope objective, telescope objective, wide-angle lens, zoom lens.

An apparatus for defect inspection of a transparent substrate comprises a light source and at least one mirror to redirect optical path of the light source; a beam expander to generate an expanded beam of the light source; an optical image reduction system for image reduction of an object wave passing through the transparent substrate; and a photodetector array configured a side of the transparent substrate.

The apparatus further comprises a filter mask configured between a first lens and a second lens of the optical image reduction system.

According to one aspect, the apparatus further comprises an intermediate optics system, a filter mask and a grating. The grating is configured between the intermediate optics system and the optical image reduction system. The filter mask is configured between the first lens and the second lens of the intermediate optics system.

According to another aspect, the apparatus further comprises an intermediate optics system, a filter mask and a beam splitter. The filter mask is configured between a first lens and a second lens of the intermediate optics system. The beam splitter is configured between optical path exit of the optical image reduction system and optical path entrance of the intermediate optics system.

The filter mask includes phase type or amplitude type.

BRIEF DESCRIPTION OF THE DRAWINGS

The components, characteristics and advantages of the present invention may be understood by the detailed descriptions of the preferred embodiments outlined in the specification and the drawings attached:

FIG. 1F illustrates a schematic perspective view showing an in-line optical system by spherical wave illumination of a defect inspection apparatus of a transparent substrate according to an embodiment of the invention;

FIG. 4A and FIG. 4B illustrate amplitude reconstruction images of the Fresnel holograms of encoding spherical reference wave according to an embodiment of the invention;

FIG. 6A to FIG. 6D illustrate amplitude image (left) and phase image (right) of the numerically reconstructed defect complex image according to an embodiment of the invention;

FIG. 8 illustrates defect phase image of dust on the transparent substrate reconstructed by numerical propagation in different planes according to one embodiment of the invention;

FIG. 10A illustrates defect complex images by using digital holograms to detect the defect complex images of the transparent substrate according to an embodiment of the invention;

FIG. 10B to FIG. 10E illustrate defect complex images determined by the defect complex images database according to an embodiment of the invention.

DETAILED DESCRIPTION

Figure 1A:
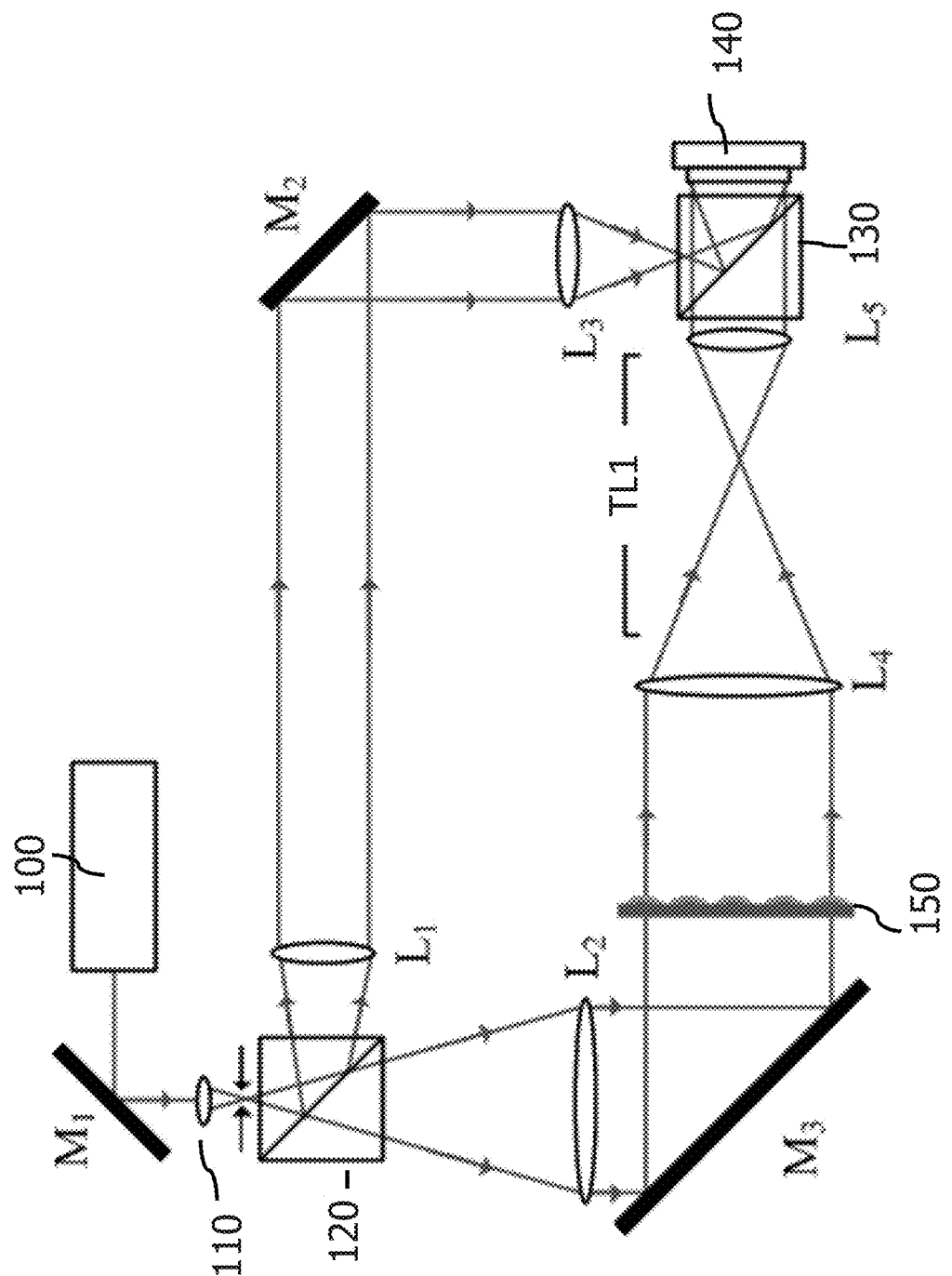
FIG. 1A illustrates a schematic perspective view showing an off-axis optical system by plane wave illumination of a defect inspection apparatus of a transparent substrate according to an embodiment of the invention.

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The invention discloses a method and apparatus by utilizing interference and wavefront recording to reconstruct the defect complex images of a transparent substrate, and characteristics analyzing, features classifying and sieving for the defect complex images of the transparent substrate as reference-based for defect detection. The embodiment indicates a database of defect complex images created by characteristics analysis, features classifying and sieving, to establish a classification unit of the defect complex images for all kinds of defects of the object to be tested, and a spherical reference wave irradiation and up-sampling technique are used to improve the equivalent resolution of photodetector array of an optical system, to achieve defect detection method of transparent substrate with high resolution of wide-field imaging effect and high fidelity of a large area.

The invention utilizes an apparatus of wavefront recording and reconstruction, and a classifying method of defect complex images in the defect complex images database for defect inspection of the transparent substrate of the, as well as utilizes the spherical reference wave irradiation and up-sampling technology to improve the equivalent resolution of photodetector array in the optical system. The defect detection apparatus is based on the defect complex image database as the basis for the defect inspection of various types of images to be tested.

The invention provides a method and an apparatus for defects inspection of a transparent substrate in order to meet the technical requirements of the above-mentioned. The invention use a light source to irradiate a transparent substrate to be measured, and diffracting by a distance to form optical diffraction field of the object. Then, the diffracted object wave is interfering with the spherical reference wave. Finally, the hologram is recorded by the photodetector array. The hologram is numerically reconstructed by the computer to obtain the defect complex images of the transparent substrate to be measured, including amplitude image and phase image, which are not restricted by pixels and pixel size of the photodetector array.

As shown in FIG. 1A to FIG. 1L, they show an optical system of a defect inspection apparatus of a transparent substrate according to some embodiments of the present invention. These embodiments are applicable for processing hologram associated with at least one resolution standard sample and a transparent substrate. The hologram can be generated by the optical system of these embodiments. In the embodiment of the FIG. 1A, it provides an off-axis optical system by plane wave illumination; the optical system includes a light source 100, a beam expander (BE) 110, two beam splitters 120 and 130, a photodetector array 140 (for example: Charge-coupled device (CCD), Complementary Metal-Oxide-Semiconductor (CMOS) image sensor, photodetector), and five lens L1~L5 and three mirrors M1~M3. The light source 100 includes a vertical-cavity surface-emitting laser (VCSEL), a semiconductor laser, a solid-state laser, a gas laser, a dye laser, a fiber laser or light emitting diodes (LED). The emission type of the light source 100 comprises a light source, a planar light source or a spherical light source. The light source 100 includes coherent light source, low coherent light source or incoherent light source. The optical system includes an optical image resizing/reduction system (Telescopic Imaging System) TL1, which includes a lens L4 with 0.5 magnification ($M_{TL}$=0.5x) and focal length of 100 mm (millimeter) and a lens L5 with focal length of 50 mm. The front and rear focal length of the lens L4 can be equal or substantially equal (with a slight difference), and the front and rear focal length of the lens L5 can be equal or substantially equal (with a slight difference). The lens L3 also has a focal length of 50 mm located at reference wave terminal for spherical reference wave passing through, the front and rear focal length of the lens L3 can be equal, or substantially equal (with a slight difference). The optical path of the optical system of the inspection apparatus of the transparent substrate includes: a diode laser 100 emits a laser beam with center wavelength of 405 nm (nanometer), the laser beam reflecting by the mirror M1 and passing through the beam expander 110 to generate an expanded beam, then incident into the beam splitter 120 to output two beams respectively, followed by passing through the lens L1 of diameter 2 inch and the lens L2 of diameter 1 inch respectively to form a collimated plane wave with beam diameter of 2 inch and beam diameter of 1 inch. One beam of the two beams is passing through the object on the transparent substrate 150 to be measured to form an object wave after reflecting by the mirror M3, and the object wave is passing through the Telescopic Imaging System (lens L4 and lens L5) TL1 for image reduction as wide field object wave, and passing through the beam splitter 130 and then projecting to (including imaging or non-imaging mode) the photodetector array 140. The other beam of the two beams is reflected by the mirror M2 as the reference wave, followed by passing through the lens L3 to form spherical reference wave of numerical amplification ($M_S=2$), and passing through the beam splitter 130 and then incident to the photodetector array 140. And, the reference wave maintains off-axis angle with the object wave to perform Off-Axis digital holographic recording, in order to ensure that DC term and conjugation term of off-axis recording can be eliminated based-on the reference wave. The above three mirrors M1~M3 are only used to redirect the optical path of the laser beam. The lens L2 can be regarded as the element which can generate the beam expanding wavefront (plane wave and spherical wave). The lens L3 can be regarded as the element which can generate a planar, a spherical and an arbitrary surface wavefront.

Figure 1B:
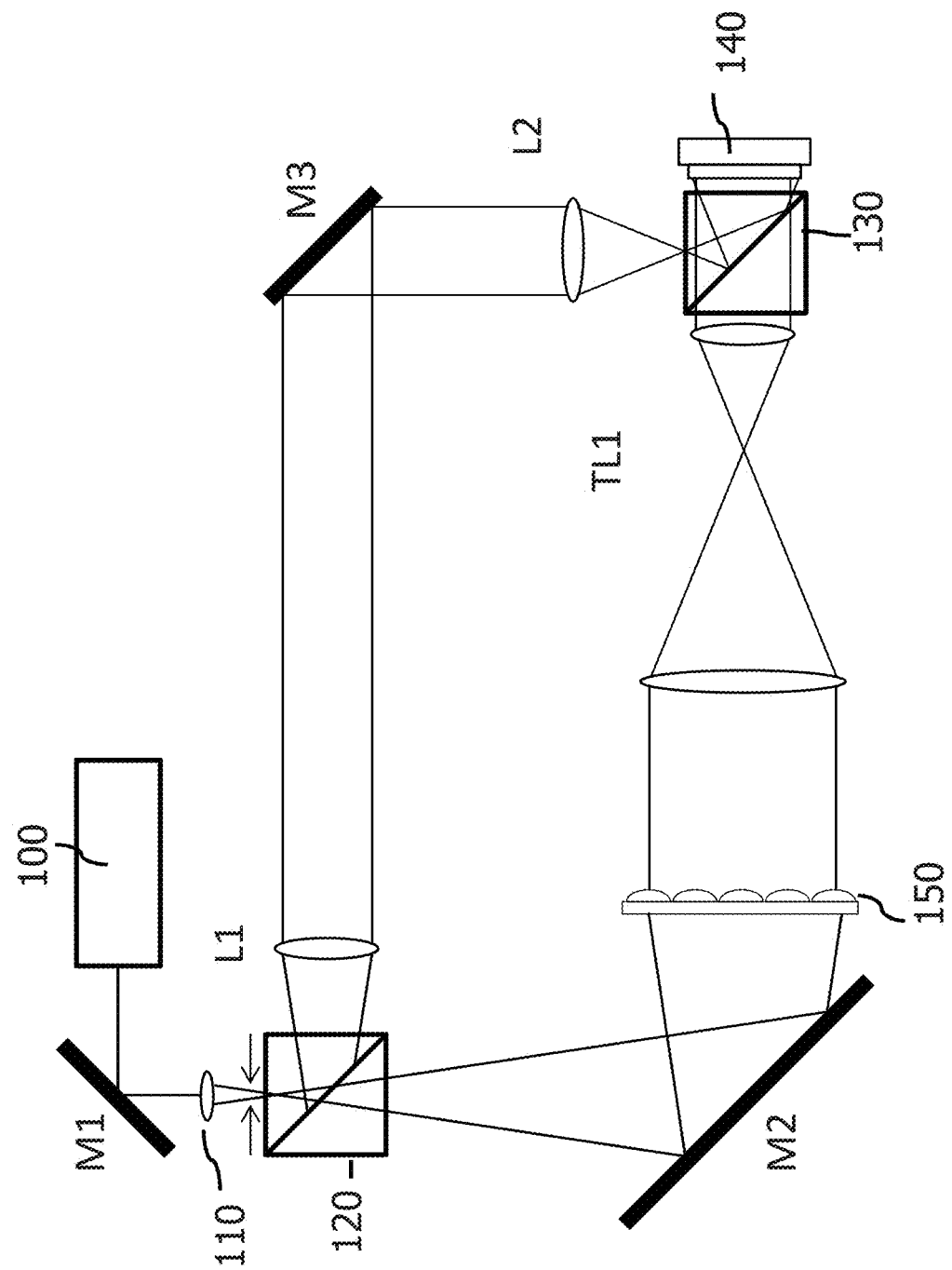
FIG. 1B illustrates a schematic perspective view showing an off-axis optical system by spherical wave illumination of a defect inspection apparatus of a transparent substrate according to an embodiment of the invention.

In another embodiment, as shown in FIG. 1B, it provides an off-axis optical system by spherical wave illumination. Comparison with FIG. 1A, the optical system omits the lens L3, and the lens L2 locates between the mirror M1 and the beam splitter 130.

Figure 1C:
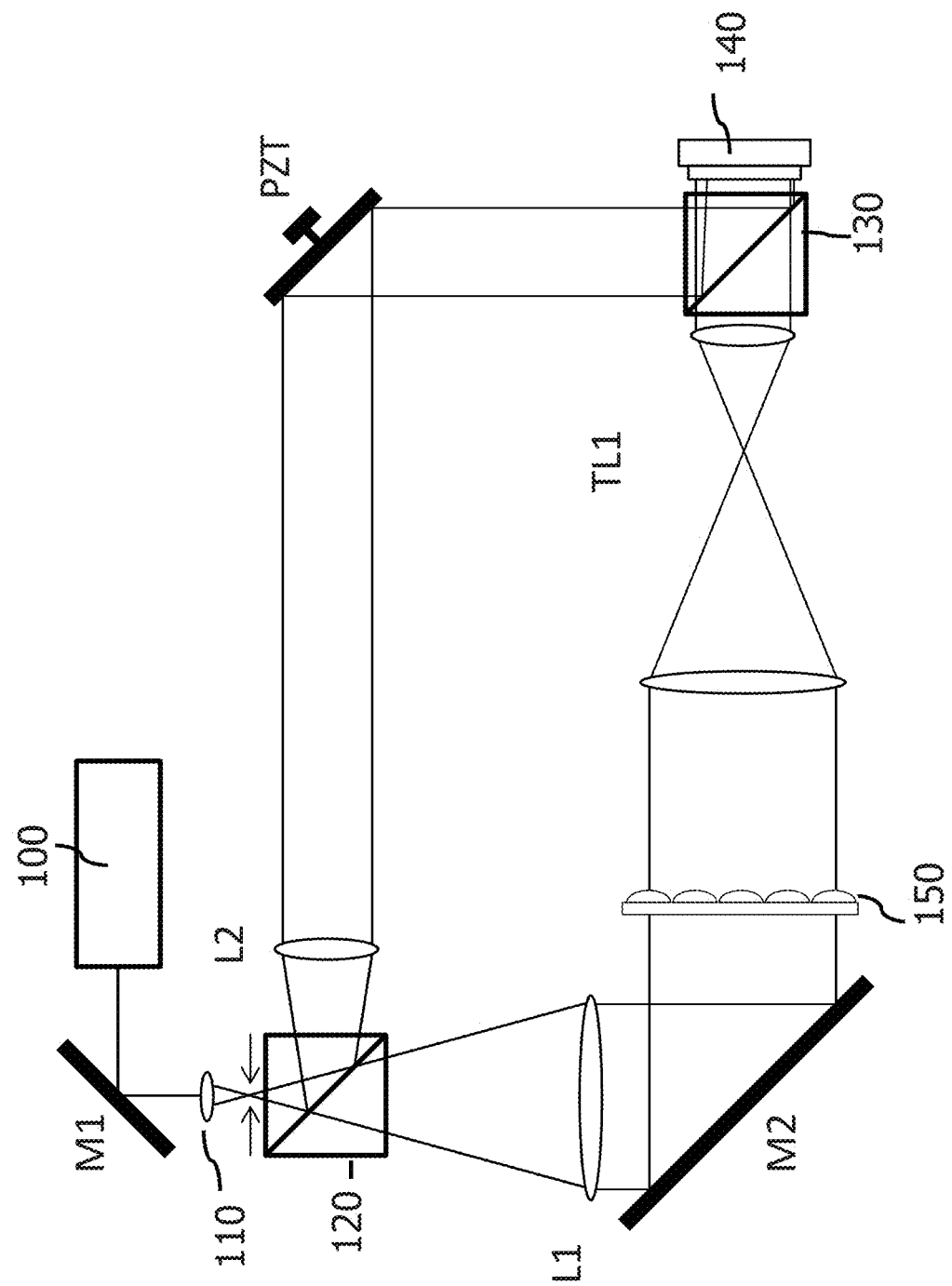
FIG. 1C illustrates a schematic perspective view showing an on-axis optical system by plane wave illumination of a defect inspection apparatus of a transparent substrate according to an embodiment of the invention.

In one embodiment, as shown in FIG. 1C, it provides an on-axis optical system by plane wave illumination. Comparison with FIG. 1A, the optical system omits the lens L3, and configured position of the lens L1 and the lens L2 is different from FIG. 1A and FIG. 1B. The mirror M3 is equipped with a piezoelectric transducers (PZT), spatial light modulator (SLM), or rotatable parallel plate, which may be as a phase shifter for adjusting phase shift of the reference wave.

Figure 1D:
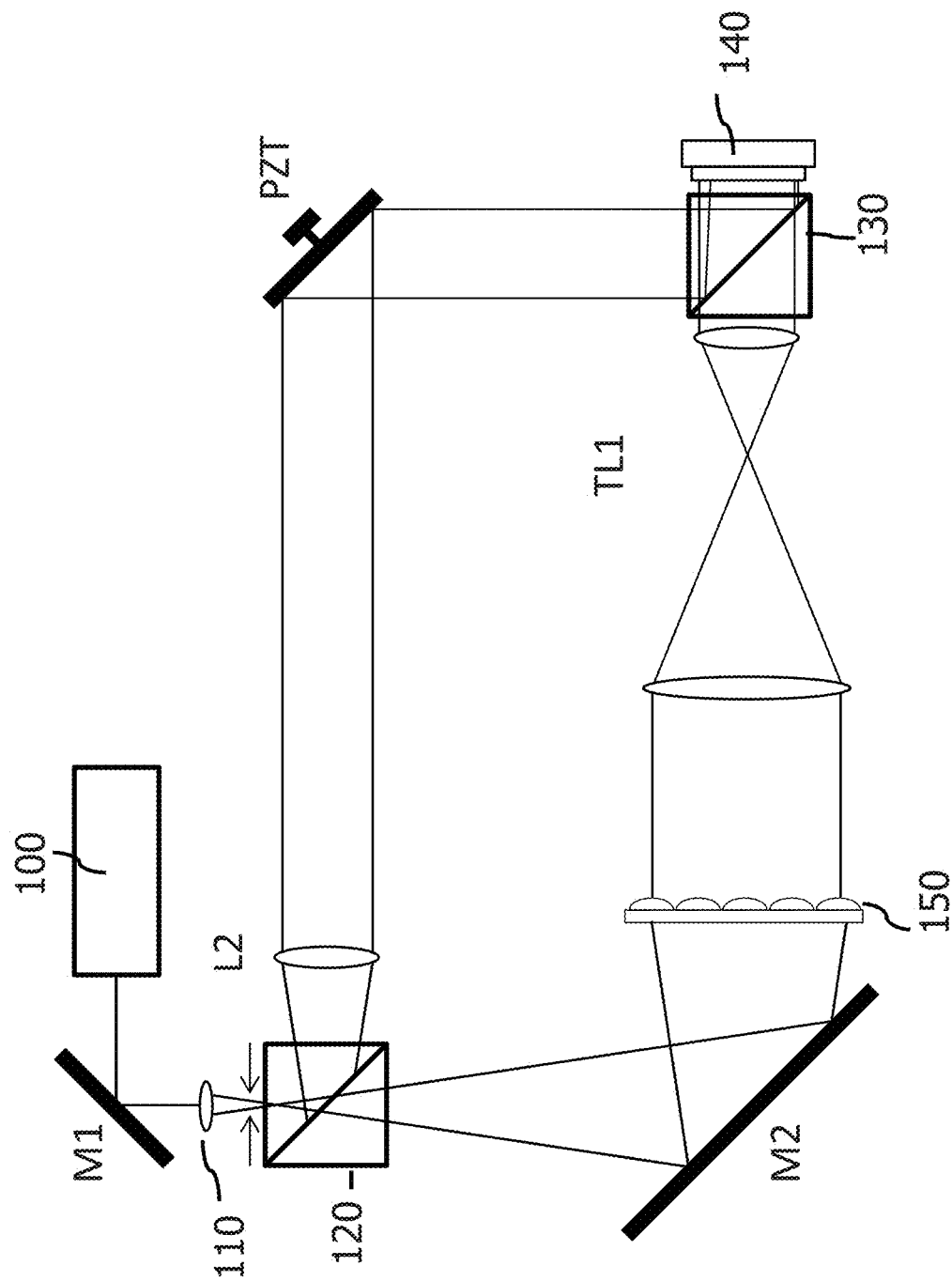
FIG. 1D illustrates a schematic perspective view showing an on-axis optical system by spherical wave illumination of a defect inspection apparatus of a transparent substrate according to an embodiment of the invention.

In one embodiment, as shown in FIG. 1D, it provides an on-axis optical system by spherical wave illumination. Comparison with FIG. 1C, the optical system omits the lens L1. The mirror M3 is equipped with a piezoelectric transducers (PZT), which may be as a phase shifter for adjusting phase shift of the reference wave.

Figure 1E:
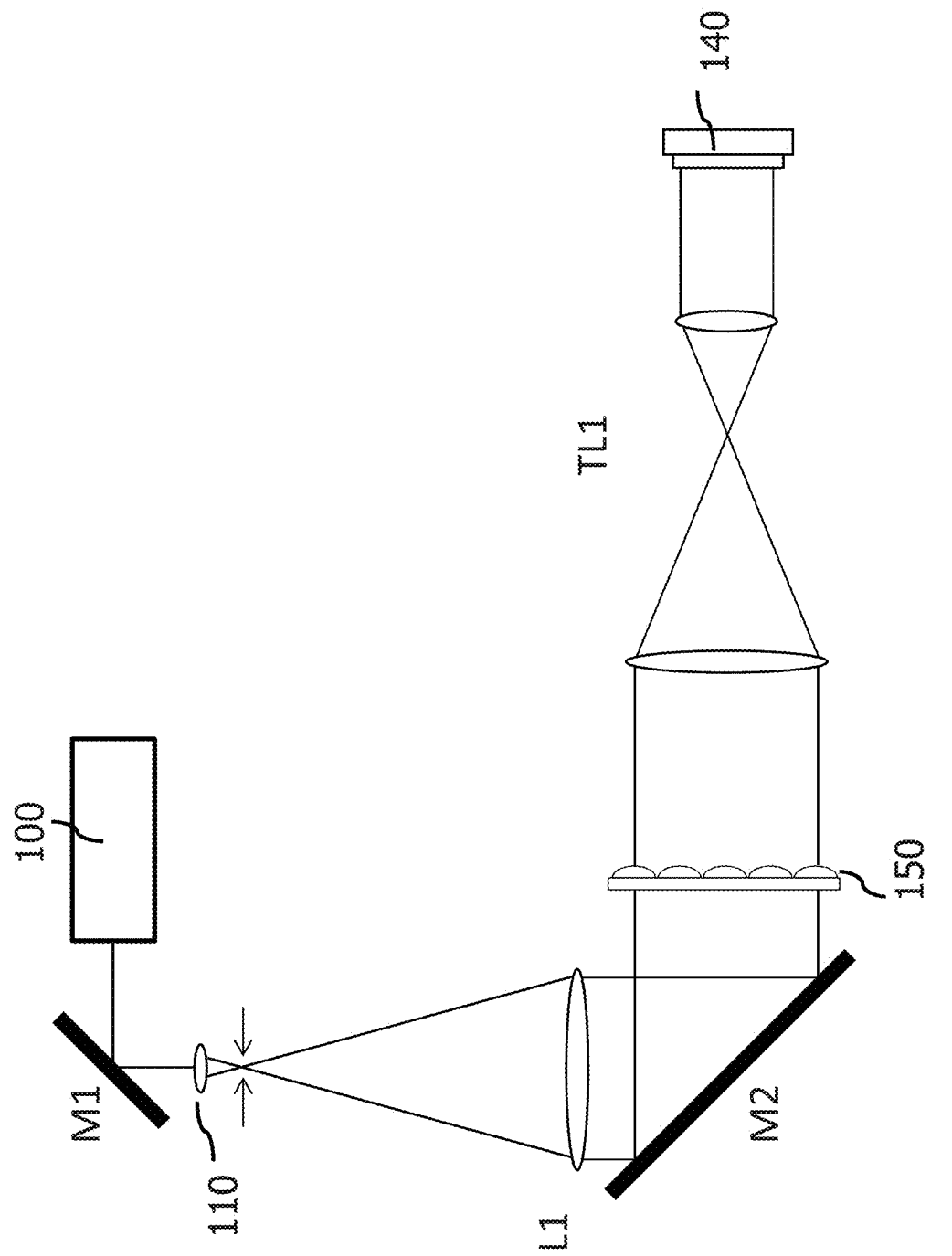
FIG. 1E illustrates a schematic perspective view showing an in-line optical system by plane wave illumination of a defect inspection apparatus of a transparent substrate according to an embodiment of the invention.

In another embodiment, as shown in FIG. 1E, it provides an in-line optical system by plane wave illumination. Comparison with FIG. 1A, the optical system omits the lens L2, the lens L3, the beam splitter 120 and 130, and the mirror M3 locates between the mirror M1 and the beam splitter 130. The object wave is interfered with the reference wave by in-line.

In one embodiment, as shown in FIG. 1F, it provides an in-line optical system by spherical wave illumination. Comparison with FIG. 1E, the optical system omits the lens L1.

Figure 1G:
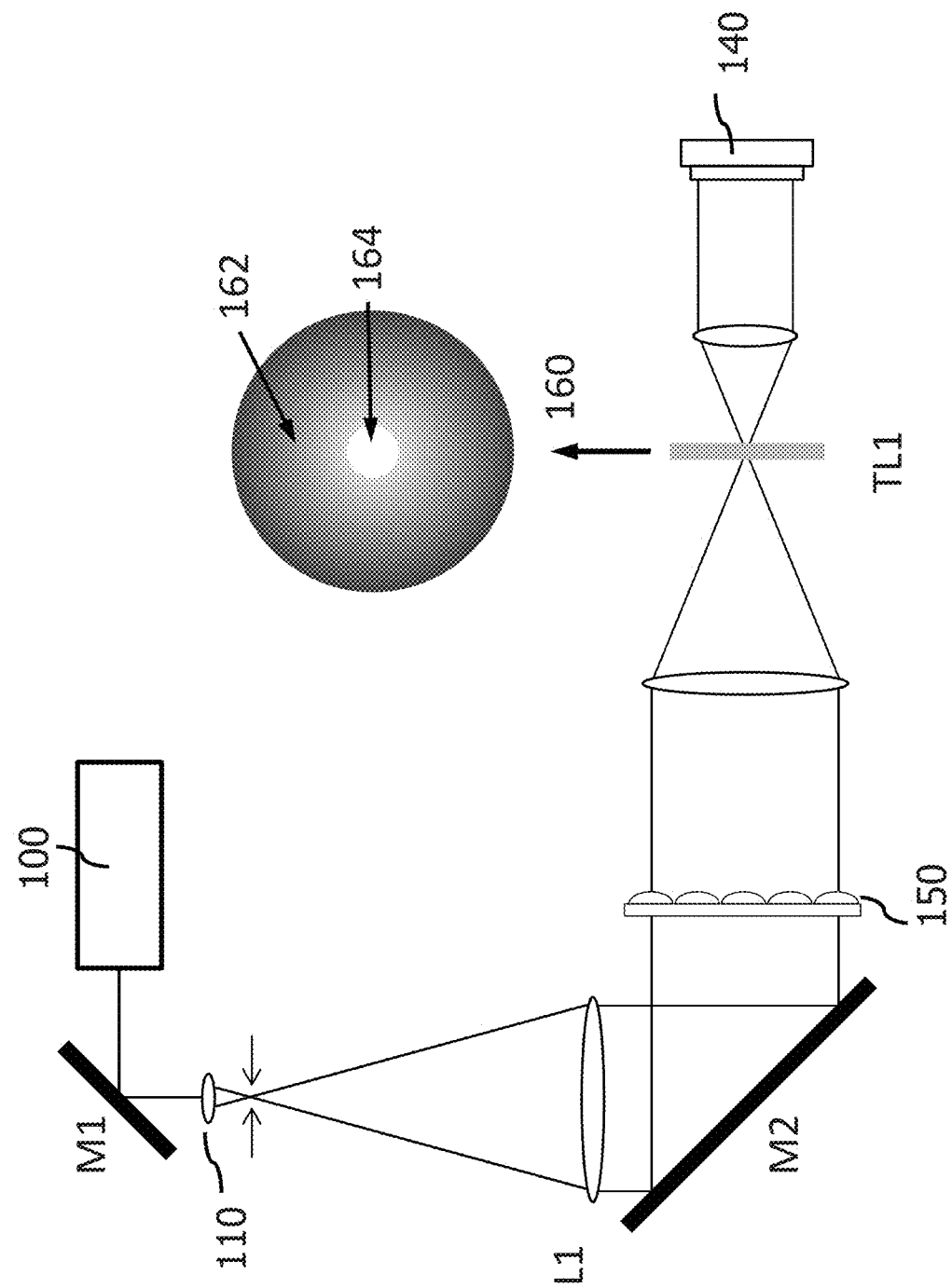
FIG. 1G illustrates a schematic perspective view showing a common-path on-axis optical system by plane wave illumination of a defect inspection apparatus of a transparent substrate according to an embodiment of the invention.

In one embodiment, as shown in FIG. 1G, it provides a common-path on-axis optical system by plane wave illumination. Comparison with FIG. 1E, the optical system further comprises a filter mask 160 configured between the two lens of the Telescopic Imaging System TL1. The filter mask 160 comprises a first filter area 162 and a second filter area 164, wherein the first filter area 162 allows the object wave passing through and the second filter area 164 allows the reference wave passing through.

Figure 1H:
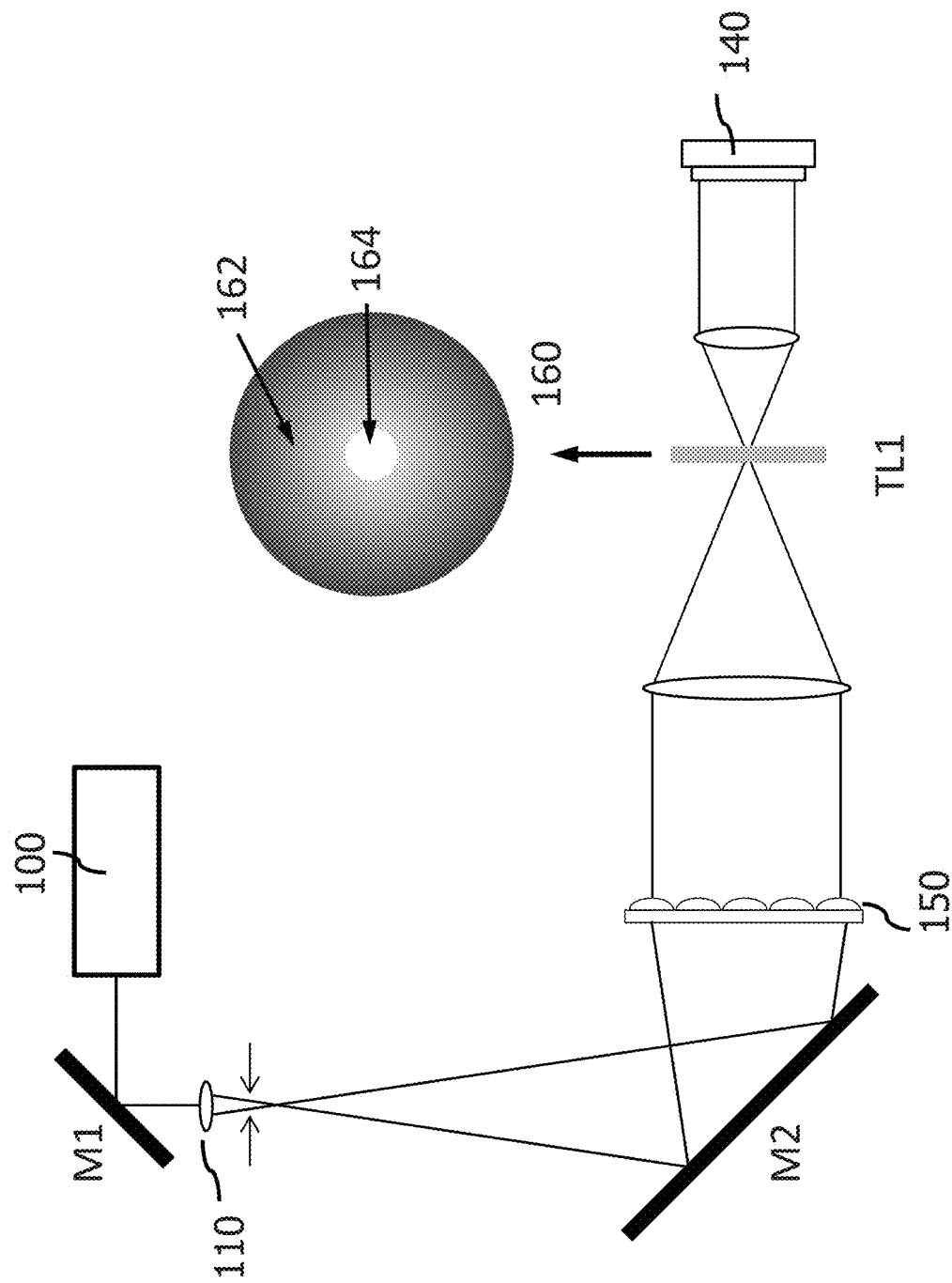
FIG. 1H illustrates a schematic perspective view showing a common-path on-axis optical system by spherical wave illumination of a defect inspection apparatus of a transparent substrate according to an embodiment of the invention.

In one embodiment, as shown in FIG. 1H, it provides a common-path on-axis optical system by spherical wave illumination. Comparison with FIG. 1G, the optical system omits the lens L1.

Figure 1I:
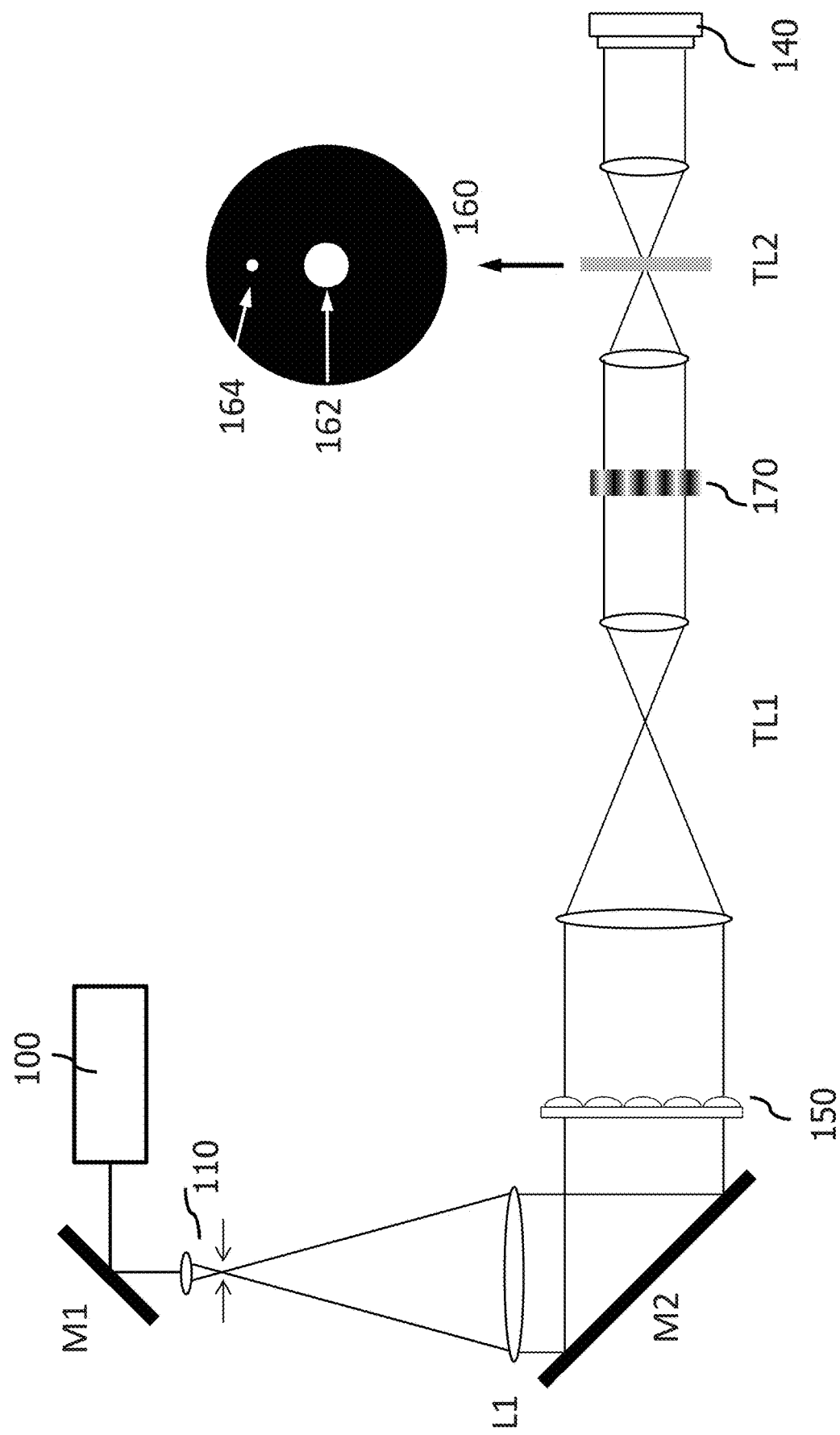
FIG. 1I illustrates a schematic perspective view showing a common-path off-axis optical system by plane wave illumination of a defect inspection apparatus of a transparent substrate according to an embodiment of the invention.

In one embodiment, as shown in FIG. 1I, it provides a common-path off-axis optical system by plane wave illumination. Comparison with FIG. 1G, the optical system further comprises an intermediate optics system TL2 and a grating 170, wherein the grating 170 is configured between the TL1 and the TL2, and the filter mask 160 is configured between the two lens of the intermediate optics system TL2. In this embodiment, the TL1 is parallel to the TL2. In one embodiment, the intermediate optics system TL2 is an optical image resizing/reduction system (Telescopic Imaging System).

Figure 1J:
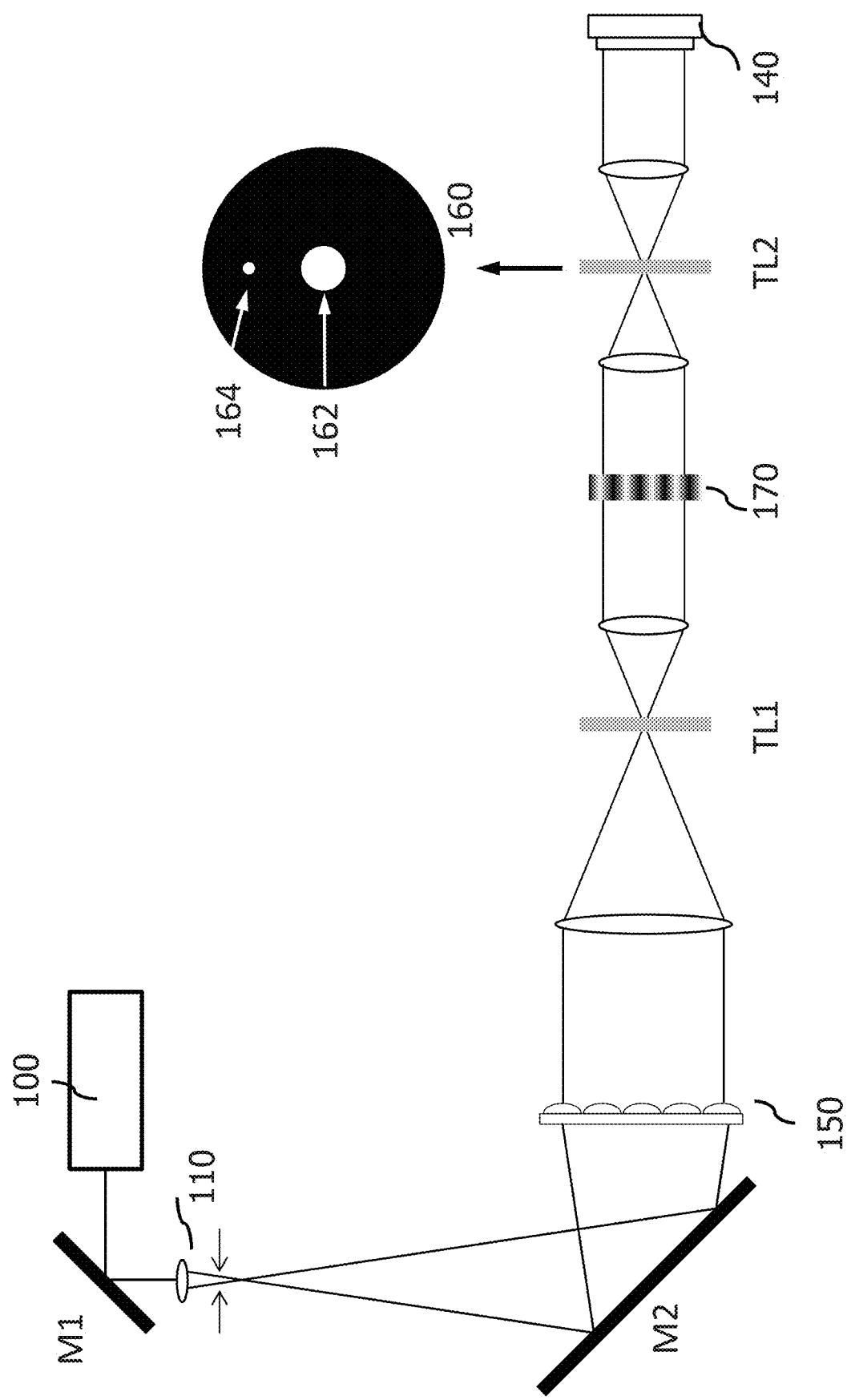
FIG. 1J illustrates a schematic perspective view showing a common-path off-axis optical system by spherical wave illumination of a defect inspection apparatus of a transparent substrate according to an embodiment of the invention.

In one embodiment, as shown in FIG. 1J, it provides a common-path off-axis optical system by spherical wave illumination. Comparison with FIG. 1I, the optical system omits the lens L1.

Figure 1K:
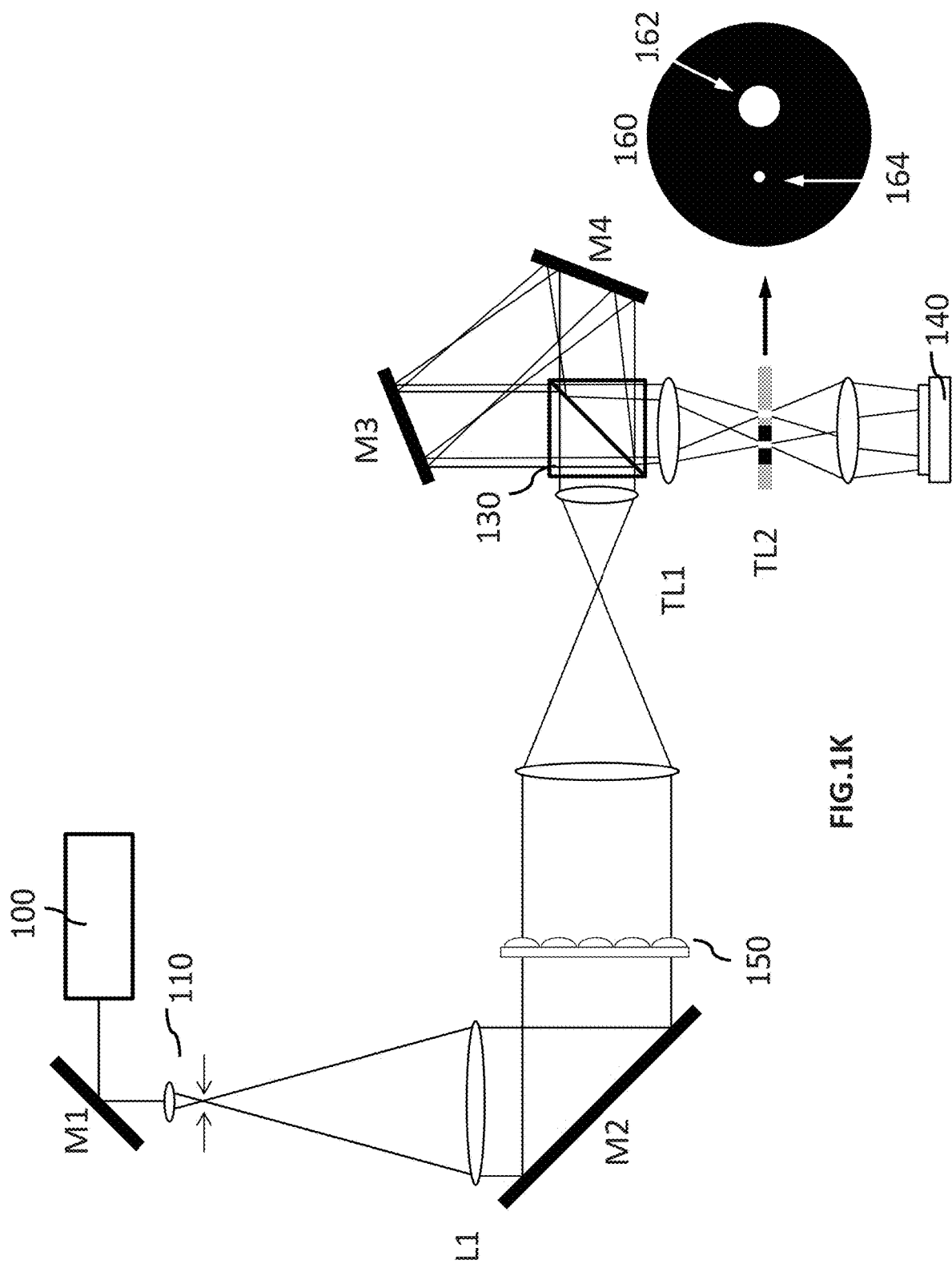
FIG. 1K illustrates a schematic perspective view showing a common-path off-axis optical system by plane wave illumination of a defect inspection apparatus of a transparent substrate according to an embodiment of the invention.

In one embodiment, as shown in FIG. 1K, it provides a common-path off-axis optical system by plane wave illumination. Comparison with FIG. 1I, the TL1 is perpendicular to the TL2, and the optical system further comprises a beam splitter 130 configured between optical path exit of the TL1 and optical path entrance of the TL2, and mirrors M3 and M4. The beam splitter 130 is used for guiding light by the two sides mirrors M3 and M4.

Figure 1L:
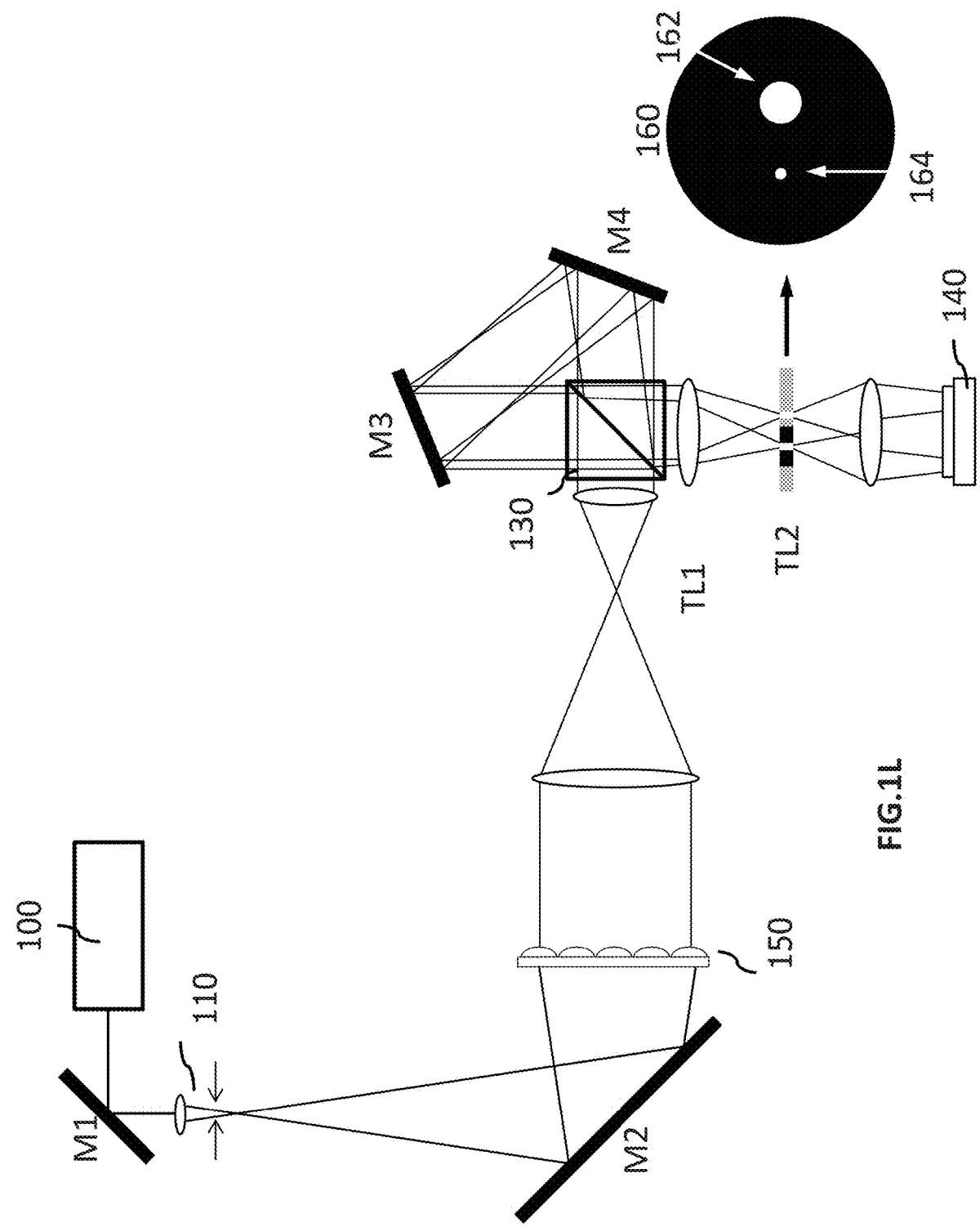
FIG. 1L illustrates a schematic perspective view showing a common-path off-axis optical system by spherical wave illumination of a defect inspection apparatus of a transparent substrate according to an embodiment of the invention.

In one embodiment, as shown in FIG. 1L, it provides a common-path off-axis optical system by spherical wave illumination. Comparison with FIG. 1K, the optical system omits the lens L1.

It should be noted that the optical system of FIG. 1A and FIG. 1B utilizes an improved Mach-Zehnder interferometer to implement off-axis digital hologram to generate wide field holograms. In another embodiment, the holograms may be utilized by mechanically moving photodetector array, the measured object and incident beam for expanding wide field to generate digital hologram of on-axis, off-axis, in-line or common-path optical scheme.

Figure 2:
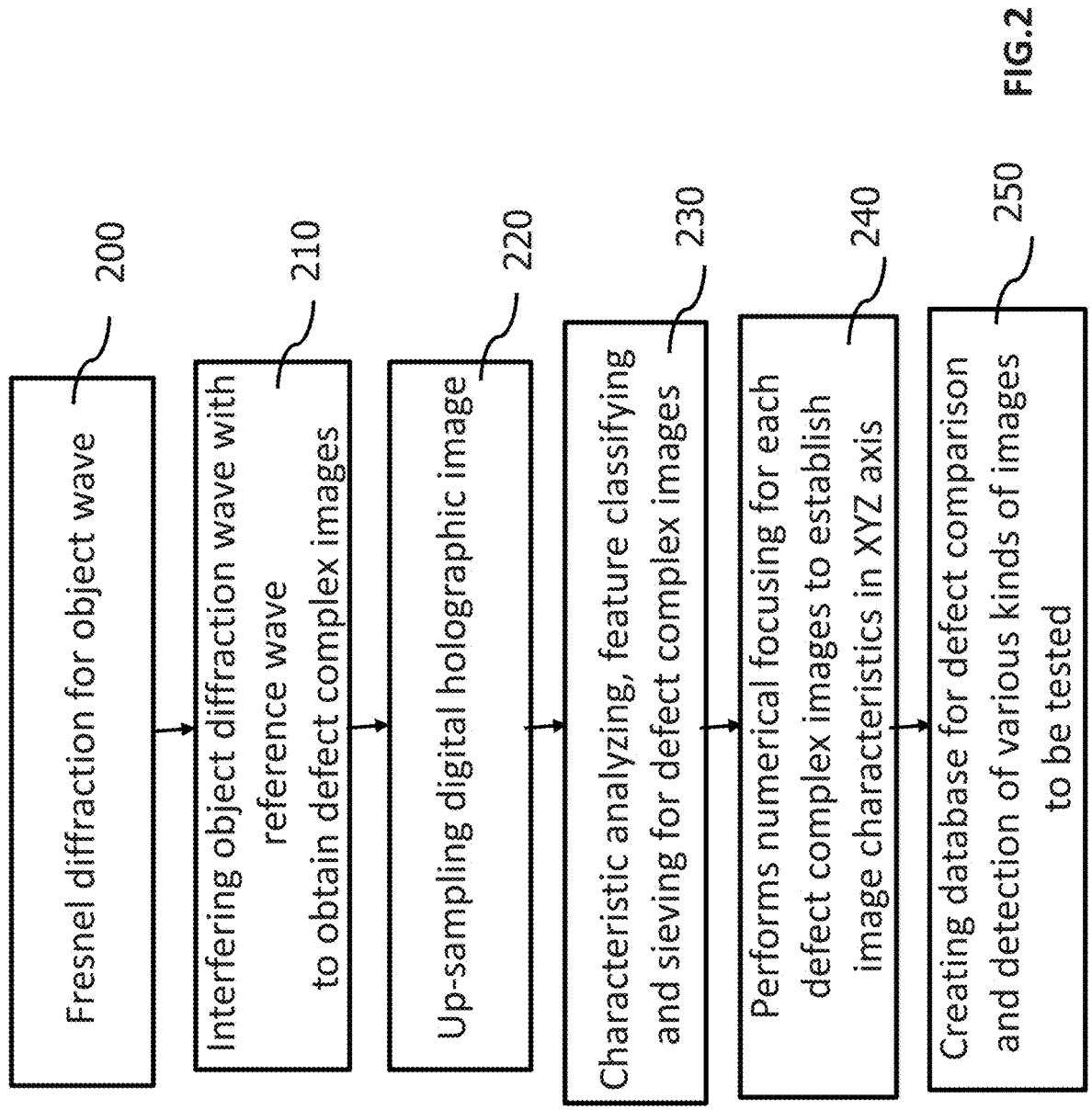
FIG. 2 illustrates a process flow of a method of defect inspection of a transparent substrate based on one embodiment of the present invention.

FIG. 2 illustrates shows a process flow of a method of defect inspection of a transparent substrate based on one embodiment of the present invention. The invention employs a defect inspection apparatus of the transparent substrate to deal with defect complex images of the transparent substrate, and characteristics analyzing, features classifying and sieving for the defect complex images of the transparent substrate as reference-based for defect inspection. Method for defect inspection of the transparent substrate includes the steps 200~250. First of all, in the step 200, object wave of the transparent substrate is diffracted by the defect inspection apparatus (such as optical apparatus of FIG. 1A~FIG. 1L). For example, the diffraction of the object wave is geometric imaging, Fresnel diffraction or Fraunhofer diffraction. In the step 200, it can solve the problem that high frequency information of the object to be measured can't be effectively analyzed due to actual pixel size limit of the photodetector array. In this embodiment, when considering the optical field distribution of plane wave incident to the object to be measured, the diffraction information will be image reduction by the optical image reduction system to achieve wide field image output; and then imaging to the intermediate image plane of the object, and diffracting from a distance to Fresnel diffraction region to generate optical diffraction field, to solve the constrained issue of actual pixel size of the photodetector array.

In one embodiment, the transparent substrate is for example glass substrate, sapphire substrate, transparent ceramic substrate, transparent polymer substrate, such as polycarbonate (PC) substrate, Polymethylmethacrylate (PMMA) substrate or high transmittance optical substrate.

Next, in the step 210, the object diffraction wave of the transparent substrate is interfered with the reference wave to obtain defect complex images of the transparent substrate to be measured. In one embodiment, the interference of the above two waves forms at least one hologram for wavefront recording and reconstructing of the wide field hologram to obtain the defect complex images of the transparent substrate to be measured. The reference wave includes: plane wave, spherical wave or arbitrary shape wave. In this embodiment, the spherical reference wave is magnified by encoding spherical factor to reduce spectrum bandwidth of the measured object in the Fourier plane, in order to avoid spectrum overlap between the object spectrum and DC term or conjugate term, and the effective number of pixels can retrieve and record high frequency information of the object to be measured. The magnification of the encoding spherical factor is shown as follows:

$$M_s = \left(1 - \frac{z_O}{z_R}\right)^{-1}$$

Among them, the object distance $z_O$ is the distance from the intermediate image plane of the object to the photodetector array, the distance $z_R$ is from focus point of the spherical reference wave to the photodetector array, and $M_s$ indicates numerical magnification. The spectrum bandwidth of the object in the Fourier plane can be modulated by means of the encoding spherical factor of the reference wave, in which the effective sampling bandwidth of the spectrum ($a^{TL}$) is as follows:

$$\alpha^{TL} = \frac{NA}{\lambda M_s} \frac{N\Delta x}{M_{TL}}$$

NA is the numerical aperture, $\lambda$ is the wavelength of incident light, N is the pixels number of the photodetector array, $\Delta x$ is pixel size, and $M_{TL}$ is magnification of the optical image reduction system. However, the spatial frequency of the interference fringes formed by the object wave and the spherical reference wave will be limited by the actual pixel size of the photodetector array. The sampling condition of the interference fringes is as follows:

$$C_p = \frac{f_{max}}{1/2\Delta x} \le 1$$

$C_p$ is the sampling condition for the interference fringe, $f_{max}$ is upper value limit of allowable spatial frequency of the photodetector array. As considering $C_p > 1$, the spatial frequency of the interference fringes can't be resolved based on pixel of the photodetector array. As considering $C_p \le 1$, the spatial frequency of the interference fringes can be resolved by pixel of the photodetector array. In the embodiment of the invention, the spherical reference wave is used for interfering, and upper value limit of spatial frequency follows the relation $f_{max} = N\Delta x/2\lambda z_O$. Therefore, when interferes with the reference wave, the sampling condition of the interference fringes can be expressed as follows:

$$C_p = \frac{N\Delta x^2}{\lambda z_O} \le 1 \qquad \text{(reference plane wave)}$$

$$C_p = \frac{N\Delta x^2}{\lambda}\left|\frac{1}{z_O} - \frac{1}{z_R}\right| = \frac{N\Delta x^2}{\lambda z_O M_s} \le 1 \quad \text{(reference spherical wave)}$$

When the reference wave is plane wave, the spatial frequency of the interference fringe is a constant. However, when the reference wave is a spherical wave, the spatial frequency of the interference fringe will change with the phase profile of the spherical reference wave to generate a higher spatial frequency of the interference fringe. The spatial frequency of the interferometric fringes such changes is limited by the pixel size of the photodetector array, so that the numerical magnification of the reconstructed image is limited, and thereby incapable of obtaining effective sampling bandwidth of the object spectrum. The effective sampling bandwidth of the spectrum determines the lateral resolution of the optical system as follows:

$$\Delta\delta = 0.77 \frac{1}{\alpha^{TL} M_s} \frac{N\Delta x}{M_{TL}}$$

$\Delta\delta$ is the lateral resolution, $a^{TL}$ is the spectrum sampling bandwidth, and coherence coefficient is 0.77. In constraint of the pixel size of the photodetector array, the spherical reference wave can make numerical magnification restricted in $C_p = 1$ by the spatial frequency of the interference fringes. Therefore, this will create a new object $z_O$, so that the spatial frequency of the interference fringes can be resolved by the photodetector array. The lateral resolution describes as follows:

$$\Delta\delta = 0.77 \frac{\lambda z_O}{\alpha^{TL} M_{TL}\Delta x} C_p$$

Accordingly, the optimal lateral resolution and field of view of the wide field digital holography is obtained by optimizing the object distance $z_O$ and the spherical reference wave (light) $z_R$.

The above-mentioned wide field digital holography may be used to complete wavefront recording and reconstruction, in order to obtain the complex images of the object to be measured.

Subsequently, in the step 220, it utilizes digital holography for defects inspection on the transparent substrate, and the digital hologram is performed by an up-sampling technology to enhance the equivalent resolution of the photodetector array of the optical system, further to achieve high resolution wide field imaging effect. It utilizes numerical reconstruction method, such as Fourier transform approach, convolution approach, angular spectrum approach or Fresnel diffraction transform approach to reconstruct the object wave of the transparent substrate. In this embodiment, the diffraction wave of the object is reconstructed by numerical reconstruction method of Fourier transform approach. In the numerical reconstruction method of Fourier transform approach, the number of pixels will be changed with the reconstruction distance. This feature will make pixel size reduction of the reconstructed image, in order to avoid the actual pixel size of the photodetector array to be restricted, and at the same time to achieve the purpose of up sampling the reconstructed image.

Figure 3A:
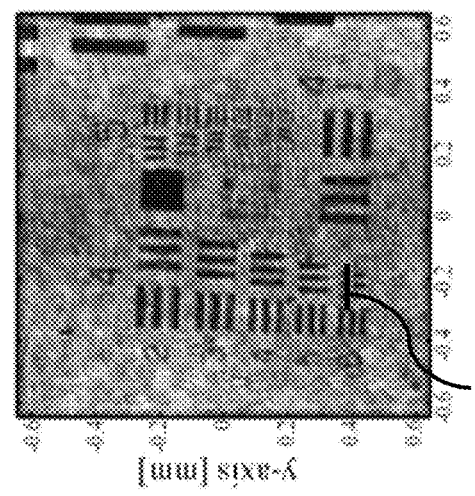
FIG. 3A illustrates an amplitude reconstruction images of Fresnel holograms, non-using up-sampling technique according to an embodiment of the invention.
Figure 3B:
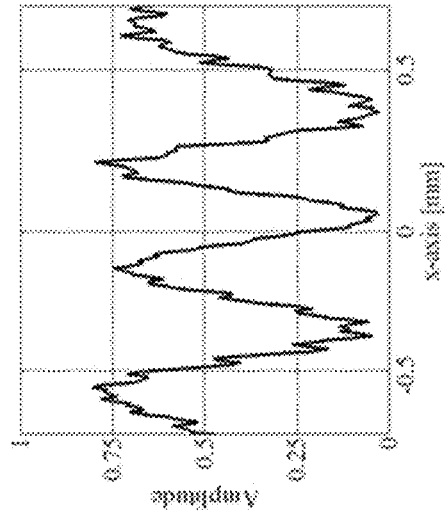
FIG. 3B illustrates an amplitude reconstruction images of Fresnel holograms, using up-sampling technique according to an embodiment of the invention.
Figure 3C:
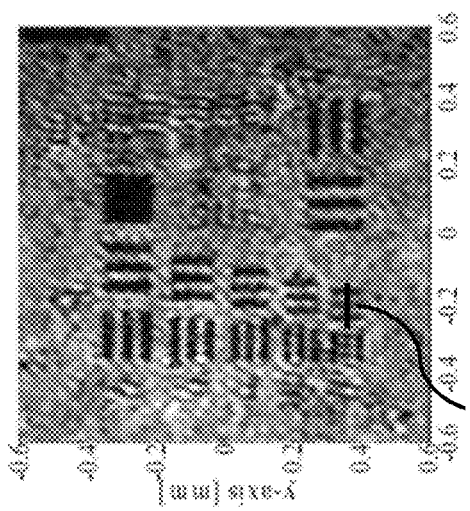
FIG. 3C and FIG. 3D illustrate one-dimensional profile information of black solid line of FIG. 3A and FIG. 3B respectively.
Figure 3D:
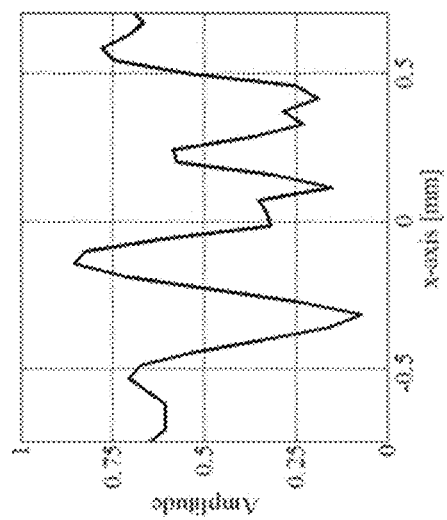

As shown in FIG. 3A and FIG. 3B, they show amplitude reconstruction images of Fresnel holograms, experimental results of the measuring resolution of standard samples. FIG. 3A shows number of pixels 300×300 without using up-sampling technology, FIG. 3B shows number of pixels 1900×1900 by using up-sampling technology. FIG. 3A and FIG. 3B illustrate comparison results by using up-sampling technique, and number of pixels can be increased from 300×300 to 1900×1900. That is, the reconstruction approach by up-sampling technique combining with Fresnel hologram can improve six times of the pixel resolution. In addition, comparing one-dimensional profile information of black solid line 301, 302 of FIG. 3A and FIG. 3B, linewidth of reconstructed amplitude images of the resolution standard sample can be effectively improved by using the up-sampling technique, as shown in FIG. 3C and FIG. 3D.

Figure 5A:
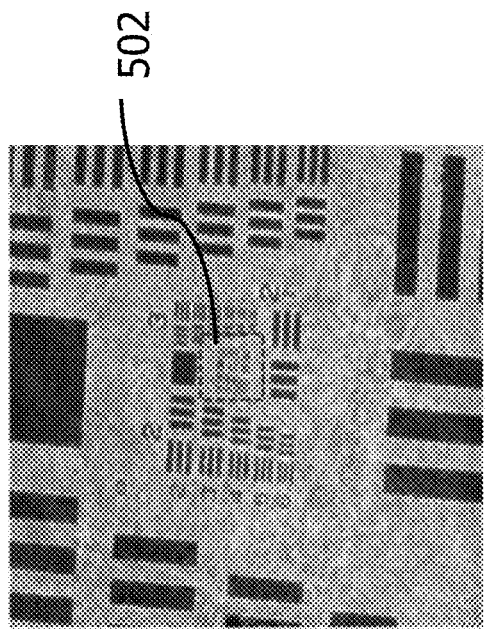
FIG. 5A and FIG. 5B illustrate amplitude reconstruction images of the holograms before and after the optimization of the holograms according to an embodiment of the invention.
Figure 5B:
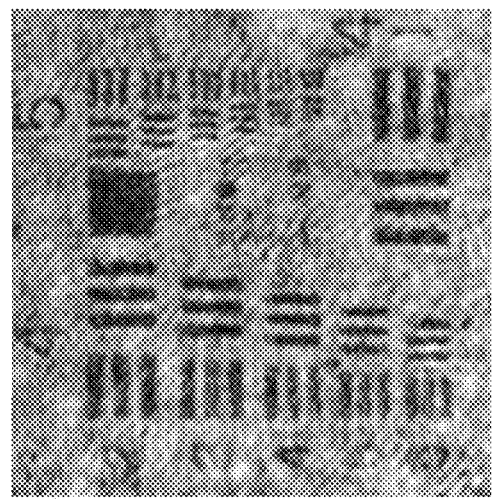
Figure 5C:
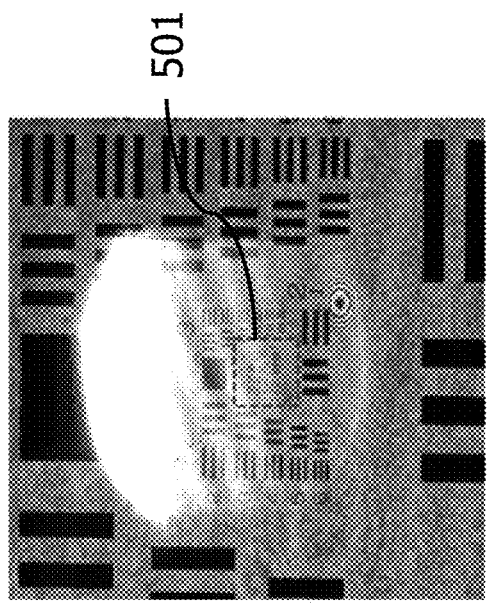
FIG. 5C and FIG. 5D illustrate the region of interest of black wide line of FIG. 5A and FIG. 5B respectively.
Figure 5D:
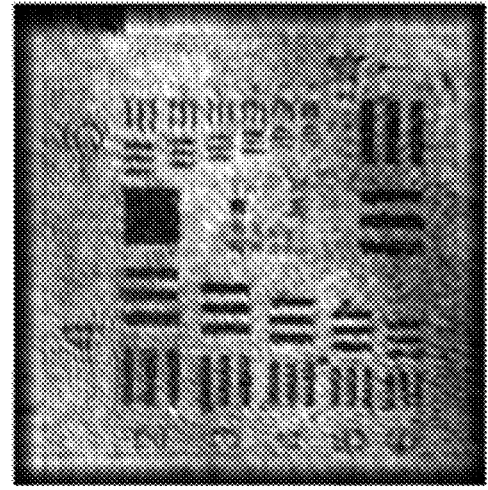

Then, continuing the spherical reference wave of the step 210 will improve effective spectrum sampling bandwidth in the wide field digital holography, to retrieve complete high frequency information of the resolution standard samples. In Fourier transform approach, magnification of the reconstructed image is changed by adjusting the numerical spherical reference wave, and digital focusing is performed by adjusting propagating distance. As shown in FIG. 4A and FIG. 4B, they show amplitude reconstruction images of the Fresnel holograms of encoding spherical reference wave. As shown in FIG. 4A, it shows when the object distance $Z_0$=7 mm, change $Z_R$=35 mm, numerical magnification of Ms=1.26×, the linewidth of element 3 of group 5 in black box 401 can be resolved, and up to linewidth 12.40μ m of lateral resolution. As shown in FIG. 4B, it shows when the object distance $Z_0$=7 mm, change $Z_R$=20 mm, numerical magnification of Ms=1.51×, the linewidth of Group 5 Element 5 in black box 402 can be resolved, and up to linewidth 9.84 μm of lateral resolution. Finally, considering the constraint of pixel size of the photodetector array, distance of the object distance $Z_0$ and the spherical reference wave $Z_R$ will be adjusted to optimize the spatial frequency of the interference fringes to the condition $C_p$=1. As shown in FIG. 5A and FIG. 5B, they show amplitude reconstruction images before and after the optimization of the holograms, experimental results of spatial frequency of the interference fringe of the resolution standard samples. As shown in FIG. 5A, prior to the hologram optimization, the field of view will be limited by the spatial frequency of the spherical interference fringes and pixel size of the photodetector array. FIG. 5B shows amplitude reconstruction images after the optimization of the holograms, which field of view can be effectively promoted. In addition, FIG. 5C and FIG. 5D respectively show region of interest of black wide line of FIG. 5A and FIG. 5B, wherein black box 501, 502 indicates that element 5 of group 5 of FIG. 5D has better lateral resolution 9.84 μm. The numerical reconstruction of the hologram contains the defect complex images information of the transparent substrate. Based-on modulation of the numerical spherical phase, the complex images by numerical reconstruction will include amplitude image and phase image.

Next, in the step 230, some kinds of objects to be measured are performed by wavefront recording and reconstruction of hologram, and characteristics analyzing, features classifying and sieving for the defect complex images of the transparent substrate. The defect complex images contain amplitude images and phase images. In this embodiment, some kinds of the defect complex images of the transparent substrate are analyzed and classified. As shown in FIG. 6A to FIG. 6D, they show amplitude image (left) and phase image (right) of the defect complex image, respectively showing bubble of FIG. 6A, dust of FIG. 6B, scratch of FIG. 6C and watermark of FIG. 6D. According to the characteristics of the retrieved defect complex image, the characteristics classification of the defect complex images describes in the table 1.

TABLE 1

| | amplitude image | phase image |
|---|---|---|
| bubble | 1. Transparent<br>2. Boundary can be focused by numerical propagation | 1. Approximate micro lens properties<br>2. The phase height is lower than the base level |
| dust | 1. Black, non-transparent<br>2. Without focusing effect at different planes | 1. Ambiguous phase and no specific shape<br>2. Phase broken discontinuity |
| scratch | 1. Transparent<br>2. Irregular strip distribution | 1. Semi regular shape distribution<br>2. Phase part discontinuity |
| watermark | 1. Obvious boundary | 1. The boundary of watemiark has step phase change |

Figure 7:
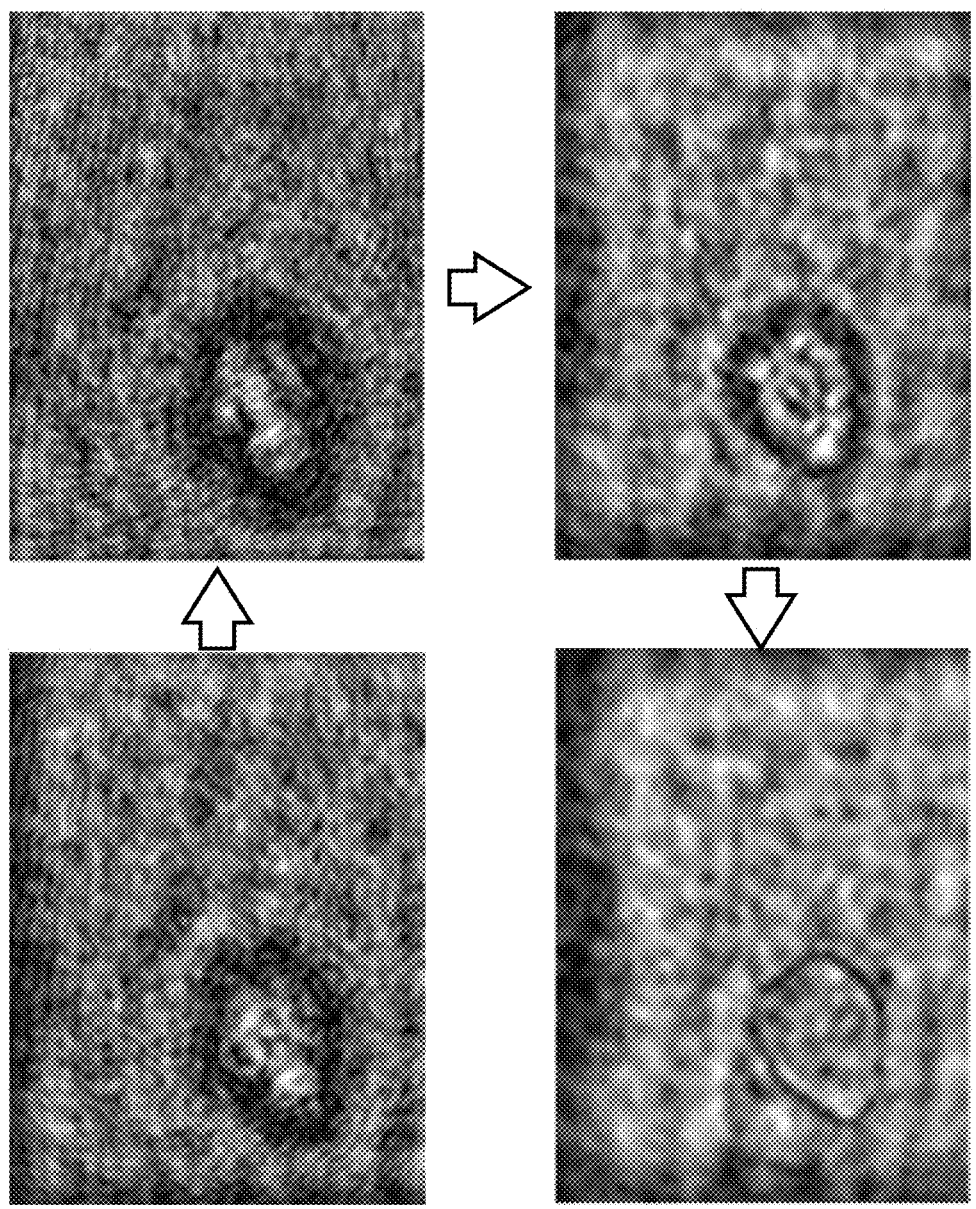
FIG. 7 illustrates defect phase image of bubble on the transparent substrate reconstructed by numerical propagation in different planes according to one embodiment of the invention.

Then, in the step 240, it performs numerical propagation and focusing for each defect complex images by defect inspection apparatus of the transparent substrate, in order to observe characteristics of the amplitude image and phase image in different planes, and define (establish) image characteristics and spatial distribution of the defect complex images in the three-dimensional coordinate axis (X-Y-Z). That is, the image characteristics and spatial distribution of the defect complex images in different plane of reconstruction are then created. The characteristics of the object to be measured of the present invention is observed through the defect complex images, and the defect complex images can be recorded no matter imaging or non-imaging. In this embodiment, it depicts numerical propagation and focusing for bubble and dust, as shown in FIG. 7 and FIG. 8. As shown in FIG. 7, it shows defect phase image of bubble on the transparent substrate reconstructed by numerical propagation, following the direction of the arrow for representing the reconstructed phase images in different planes, and the last one is the numerical focusing image of the bubble. FIG. 8 shows defect phase image of dust on the transparent substrate reconstructed by numerical propagation, following the direction of the arrow for representing the reconstructed phase images in different planes, and the last one is the numerical focusing image of the dust, which can't fully focus due to light scattering effect. The experimental results indicate that the image change on boundary is quite obvious as the phase image of the bubble of FIG. 7 in different propagation distance, and the phase image of the dust of FIG. 8 shows a disorder and stray distribution in different propagation distance. This shows that the different defect complex images have different image characteristics and spatial distribution.

Figure 9D:
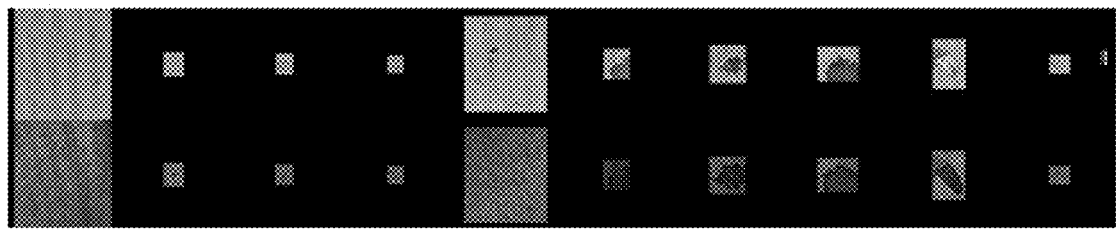
FIG. 9A to FIG. 9D illustrate a defect complex image database of the transparent substrate according to an embodiment of the invention.
Figure 9C:
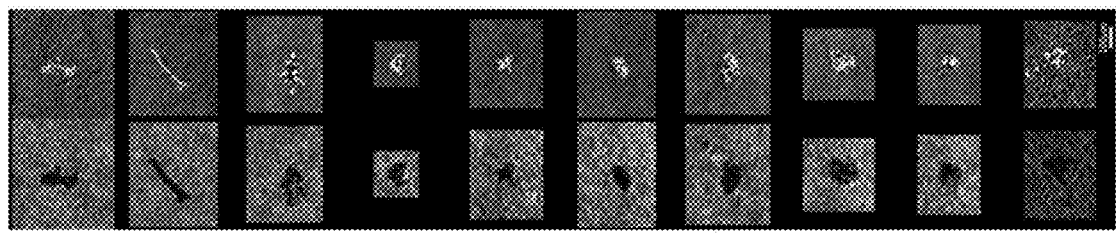
Figure 9B:
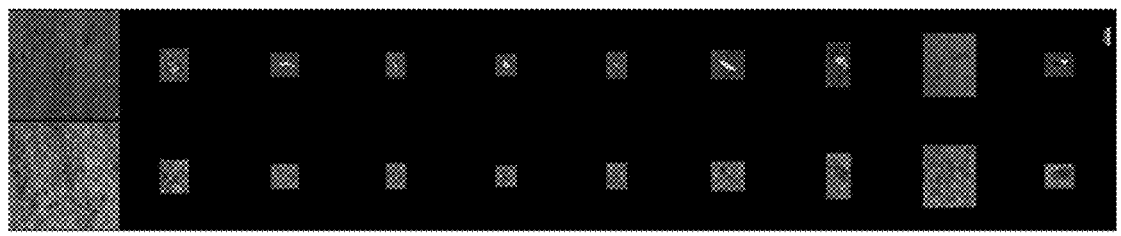
Figure 9A:
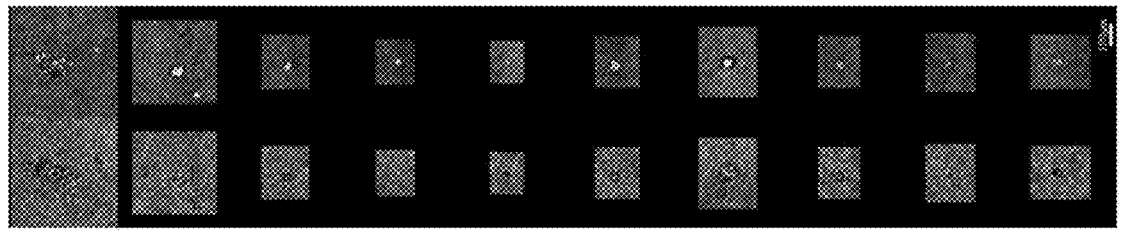

Finally, in the step 250, the defect complex image database is established, and the database is used for defect comparison and detection of various kinds of images to be tested. The defect complex images database is established by the defect inspection apparatus of the transparent substrate based-on characteristics of the defect complex images, for features classifying and sieving defect complex images. That is, the defect complex images can be stored in a complex image database. The identification and classification of the defect complex images can be performed by a classification unit of the defect complex images. In this embodiment of the present invention, a defect complex image database of the transparent substrate, such as FIG. 9A to FIG. 9D, can be established based on the characteristics of the defect complex images obtained in the step 230 and the step 240. The types of the defect complex images can be classified as amplitude image (left) and phase image (right), and the defect complex images includes bubble complex images of FIG. 9A, dust complex images of FIG. 9B, scratch complex images of FIG. 9C, and watermark complex images of FIG. 9D. The inspection processes of the identification and classification of the defect complex images are finished in the step 240 and the step 250. Firstly, defect types of the defect complex images are defined, and then comparing by the defect complex images database, followed by using the numerical reconstruction to analyze and determine the spatial distribution and location and image characteristics of the defect complex images in the three-dimensional coordinate axis (X-Y-Z). The above steps can be executed by the computer. As shown in FIG. 10A to FIG. 10E, they show the defect complex images of the transparent substrate to be measured. That is, the digital holograms are used to detect the defect images on a transparent substrate. FIG. 10A shows the defect complex images by using digital holograms to detect the defect complex images of the transparent substrate, including amplitude image (left) and phase image (right). FIG. 10B to FIG. 10E indicate the defect complex images determined by the defect complex images database, the defect complex images respectively include bubble complex images of FIG. 10B, dust complex images of FIG. 10C, scratch complex images of FIG. 10D, and watermark complex images of FIG. 10E, and the amplitude image is on the left side and the phase image is on the right side.

In summary, defect inspection of the transparent substrate is performed by defect inspection apparatus of the transparent substrate, and the defect complex images reconstructed by the digital holograms are identified and classified based-on the defect complex images database to achieve the defect inspection in wide field of view, which can really reach the purpose of the invention.

As noted above, the features and advantages of the invention include:

(1) The digital holograms are used to obtain the defect complex images of the transparent substrate, and characteristics analyzing, features classifying and sieving for the amplitude and phase of the defect complex images of the transparent substrate as the reference basis for defect inspection.

(2) The apparatus of the present invention comprises: at least one wavefront recording and reconstruction unit of digital hologram; at least one defect complex images database; at least one classification unit of defect complex images.

(3) The digital holograms are used as the wavefront recording and reconstruction unit of the defect of the transparent substrate, and the obtained defect complex images may be formed as defect complex images database by characteristics analyzing and classifying.

(4) The classification unit of the defect complex images is used for characteristics classifying and screening of some kinds of images to be measured for defect inspection.

(5) In order to achieve defect inspection of a transparent substrate of large area and high fidelity, the wavefront recording and reconstruction unit of digital holograms of the invention is utilizing wavefront recording and reconstruction improve equivalent resolution of the photodetector array of the optical system to achieve high resolution imaging effect of wide-field.

(6) The magnification of the reconstructed image can be improved by using the spherical reference wave illumination to improve the lateral resolution, and thus make the photodetector array capable of capturing and recording defect complex images information of the transparent substrate in the effective number of pixels.

(7) Up-sampling technique is performed to record Fresnel diffraction of the object to resolve the issue that the high frequency information in the defect image can't be effectively analyzed due to the constraint of the actual pixel size of the photodetector array.

(8) The experimental results verify that high fidelity amplitude and phase images of the defect of the transparent substrate, obtained by the method and apparatus of wavefront recording and reconstruction of the digital hologram, can accurately reach the purpose of defect inspection of the transparent substrate of the present invention.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A method for defect inspection of a transparent substrate, comprising:

interfering an object diffraction wave passing through said transparent substrate with a reference wave to form at least one hologram, and wavefront recording said at least one hologram to reconstruct defect complex images of said transparent substrate, wherein said reference wave is a spherical wave magnified by an encoding spherical factor to improve lateral resolution of said defect complex images of said transparent substrate;

analyzing and classifying said defect complex images of said transparent substrate by a computer to obtain characteristics classification of said defect complex images of said transparent substrate;

performing numerical propagation and focusing for each classified defect complex images of said transparent substrate to establish image characteristics and spatial distribution of said classified defect complex images in different planes, wherein said each classified defect complex images is recorded no matter which can be imaged or not;

creating defect complex images database based by said computer based-on said characteristics classification of said defect complex images, wherein said created defect complex images database recording includes characteristics classified defect complex images of said transparent substrate, each of said characteristics classified defect complex images, which is recorded with its spatial distribution information and location information in a three-dimensional coordinate axis, containing amplitude image and phase image; and comparing second defect complex images of a second transparent substrate with said defect complex images in said defect complex images database to define a defect type of said second defect complex images.

2. The method of claim 1, wherein at least one optical image reduction system is used to record said at least one hologram.

3. The method of claim 2, wherein said optical image reduction system includes a first and a second lens.

4. The method of claim 1, wherein types of said defect complex images are classified as phase image and amplitude image.

5. The method of claim 1, further comprising up-sampling said defect complex images to improve equivalent resolution of a photodetector array of said optical system.

6. The method of claim 5, further comprising a numerical propagation of Fourier transform approach, convolution approach, angular spectrum approach or Fresnel diffraction transform approach to reconstruct said defect complex images of said transparent substrate.

7. The method of claim 1, wherein said at least one hologram is recorded by at least one optical image reduction system.

8. The method of claim 1, wherein said defect complex images are classified as phase image and amplitude image.

* * * * *